(12) United States Patent
Osada et al.

(10) Patent No.: US 7,103,895 B2
(45) Date of Patent: Sep. 5, 2006

(54) OPTICAL PICKUP DEVICE, AND RECORDER AND/OR PLAYER

(75) Inventors: Yasuo Osada, Saitama (JP); Yutaka Shimada, Tokyo (JP)

(73) Assignee: Sony Corporation, (JP)

( * ) Notice: Subject to any disclaimer, the term of this patent is extended or adjusted under 35 U.S.C. 154(b) by 488 days.

(21) Appl. No.: 10/363,519

(22) PCT Filed: Jul. 11, 2002

(86) PCT No.: PCT/JP02/07070

§ 371 (c)(1),
(2), (4) Date: Mar. 4, 2003

(87) PCT Pub. No.: WO03/007295

PCT Pub. Date: Jan. 23, 2003

(65) Prior Publication Data

US 2003/0179682 A1    Sep. 25, 2003

(30) Foreign Application Priority Data

Jul. 11, 2001    (JP)    ............................. 2001-211280

(51) Int. Cl.
    G11B 7/08    (2006.01)
(52) U.S. Cl. ..................................... 720/671
(58) Field of Classification Search ............ None
    See application file for complete search history.

(56) References Cited

U.S. PATENT DOCUMENTS

| 5,615,196 A |   | 3/1997 | Kato .......................... 369/71 |
| 5,995,467 A | * | 11/1999 | Ohyama et al. ............... 369/71 |
| 6,430,143 B1 | * | 8/2002 | Kajiyama et al. ........... 720/671 |
| 6,445,674 B1 | * | 9/2002 | Morita ....................... 720/671 |

FOREIGN PATENT DOCUMENTS

EP    1313094    5/2003

* cited by examiner

*Primary Examiner*—Thang V. Tran
*Assistant Examiner*—Tawfik Goma
(74) *Attorney, Agent, or Firm*—Lerner, David, Littenberg, Krumholz & Mentlik, LLP

(57) ABSTRACT

An optical pickup device includes a feed screw to move an optical pickup having an objective lens radially on an optical disc, a sliding member provided for slidable movement in relation to the optical pickup, and connected to the optical pickup by a coil spring that forces a shutter in a direction of unmasking the objective lens, and a connection member that connects the feed screw and sliding member to each other. As the feed screw is rotated, the sliding member moves the optical pickup radially on the optical disc, and when the optical pickup has arrived at a position at the lead-in side of the optical disc, the sliding member is further slid against the force of the coil spring to move the shutter and mask the objective lens.

2 Claims, 14 Drawing Sheets

OPTICAL PICKUP DEVICE, AND RECORDER AND/OR PLAYER

TECHNICAL FIELD

The present invention relates to an optical pickup device which records or reads information signals to or from an optical disc, magneto-optical disc or the like, and also to a recorder and/or player incorporating the optical pickup device.

BACKGROUND ART

Some of the conventional optical pickup devices incorporated in the optical disc recorders and/or players are provided with a dust-proof feature to prevent any foreign matter such as dust from adhering to the objective lens.

For example, the optical pickup device with such a dust-proof feature includes an optical pickup mounted on a base to be movable radially of an optical disc, and a moving mechanism to move the optical pickup radially of the optical disc. The optical pickup device also includes a compartment for housing the optical pickup as a whole. In this optical pickup device, when the recorder and/or player is not in use, the moving mechanism is controlled to house the optical pickup into the compartment in order to prevent any foreign matter such as dust from adhering to the objective lens in the optical pickup.

In such a dust-proof feature to house the entire optical pickup in the compartment when the recorder and/or player is not in use, however, the compartment has to be larger in dimensions than the optical pickup, which will require the optical pickup device to have an increased size. Namely, a small optical pickup device cannot use any such dust-proof feature.

Also, since the dust-proof feature is intended primarily for prevention of any foreign matter from adhering to the objective lens, it should only be capable of masking the objective lens without having to house the entire optical pickup.

Also, the recent optical disc as a recording medium can record information signals mode densely. Accordingly, the recent optical pickup uses an objective lens having a larger numerical aperture and thus the distance between the optical disc and objective lens is shorter. Therefore, when the optical disc is moved into or from inside the compartment, the objective lens will possibly touch with the inner surface of the compartment and be scratched. Once the objective lens is thus scratched, information signals cannot accurately be read from or written to the optical disc.

DISCLOSURE OF THE INVENTION

Accordingly, the present invention has an object to overcome the abovementioned drawbacks of the related art by providing an optical pickup device whose entirety can be made smaller by simplification of the dust-proof feature, and also to a recorder and/or player incorporating the optical pickup device.

The present invention has another object to provide an optical pickup device designed to prevent the objective lens from being scratched when the objective lens is closed by a shutter in order to prevent any foreign matter such as dust from adhering to the objective lens, and a recorder and/or player incorporating the optical pickup device.

The above object can be attained by providing an optical pickup device including according to the present invention:

an optical pickup supported to be movable along a linear guide provided on a base to extend radially of an optical disc, and having provided thereon an objective lens which focuses a light beam emitted from a light source onto the signal recording surface of the optical disc;

a feed screw provided along the moving direction of the optical pickup to move the optical pickup radially of the optical disc; and a sliding member provided to be slidable radially of the optical disc in relation to the optical pickup, connected to the feed screw with a transmission engaged on the feed screw, having provided thereon a shutter which masks the objective lens, and connected to the optical pickup by a forcing piece which forces the shutter in a direction of unmasking the objective lens;

as the feed screw with the transmission engaged thereon is rotated, the sliding member is moved along with the optical pickup radially of the optical disc. When the sliding member has been moved to a play waiting position, the optical pickup is limited by a limiter provided on the base from moving. Then as the sliding member is slid against the force of the forcing piece in relation to the optical pickup, the shutter masks the objective lens.

Also the above object can be attained by providing a recorder and/or player including according to the present invention:

an optical pickup supported to be movable along a linear guide provided on a base to extend radially of an optical disc, and having provided thereon an objective lens which focuses a light beam emitted from a light source onto the signal recording surface of the optical disc; and a moving mechanism for moving the optical pickup along the guide.

The moving mechanism includes:

a feed screw provided along the moving direction of the optical pickup to move the optical pickup radially of the optical disc; and a sliding member provided to be slidable radially of the optical disc in relation to the-optical pickup, connected to the feed screw with a transmission engaged on the feed screw, having provided thereon a shutter which masks the objective lens, and connected to the optical pickup by a forcing piece which forces the shutter in a direction of unmasking the objective lens;

as the feed screw with the transmission engaged thereon is rotated, the sliding member being moved along with the optical disc radially of the optical disc. When the optical pickup has been moved to a play waiting position, it is limited by a limiter provided on the base from moving. Then as the sliding member is slid against the force of the forcing piece in relation to the optical pickup, the shutter masks the objective lens.

Also the above object can be attained by providing an optical pickup device including according to the present invention:

an optical pickup having provided thereon an objective lens which focuses a light beam emitted from a light source on the signal recording surface of an optical disc; and a shutter which masks the objective lens from outside; and a movement control means for controlling the movement of the optical disc while supporting the objective lens to be movable optical-axially of the objective lens.

When masking the objective lens with the shutter, the movement control means further moves the objective lens at a predetermined position further away from the optical disc.

Also the above object can be attained by providing a recorder and/or player including according to the present invention:

an optical pickup having an objective lens which focuses a light beam emitted from a light source on the signal recording surface of an optical disc;

a moving mechanism for moving the optical pickup along a guide provided on a base on which the optical pickup is mounted and radially of the optical disc;

a shutter which masks the objective lens from outside; and a movement control means for controlling the movement of the objective lens while supporting the objective lens to be movable optical-axially of the objective lens.

When the optical pickup is moved by the moving mechanism to a play waiting position at the lead-in or lead-out side of the optical disc to mask the objective lens with the shutter, the movement control means moves the objective lens at a predetermined position further away from the optical disc.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The disc drive unit according to the present invention will be described herebelow with reference to the accompanying drawings.

Figure 1:
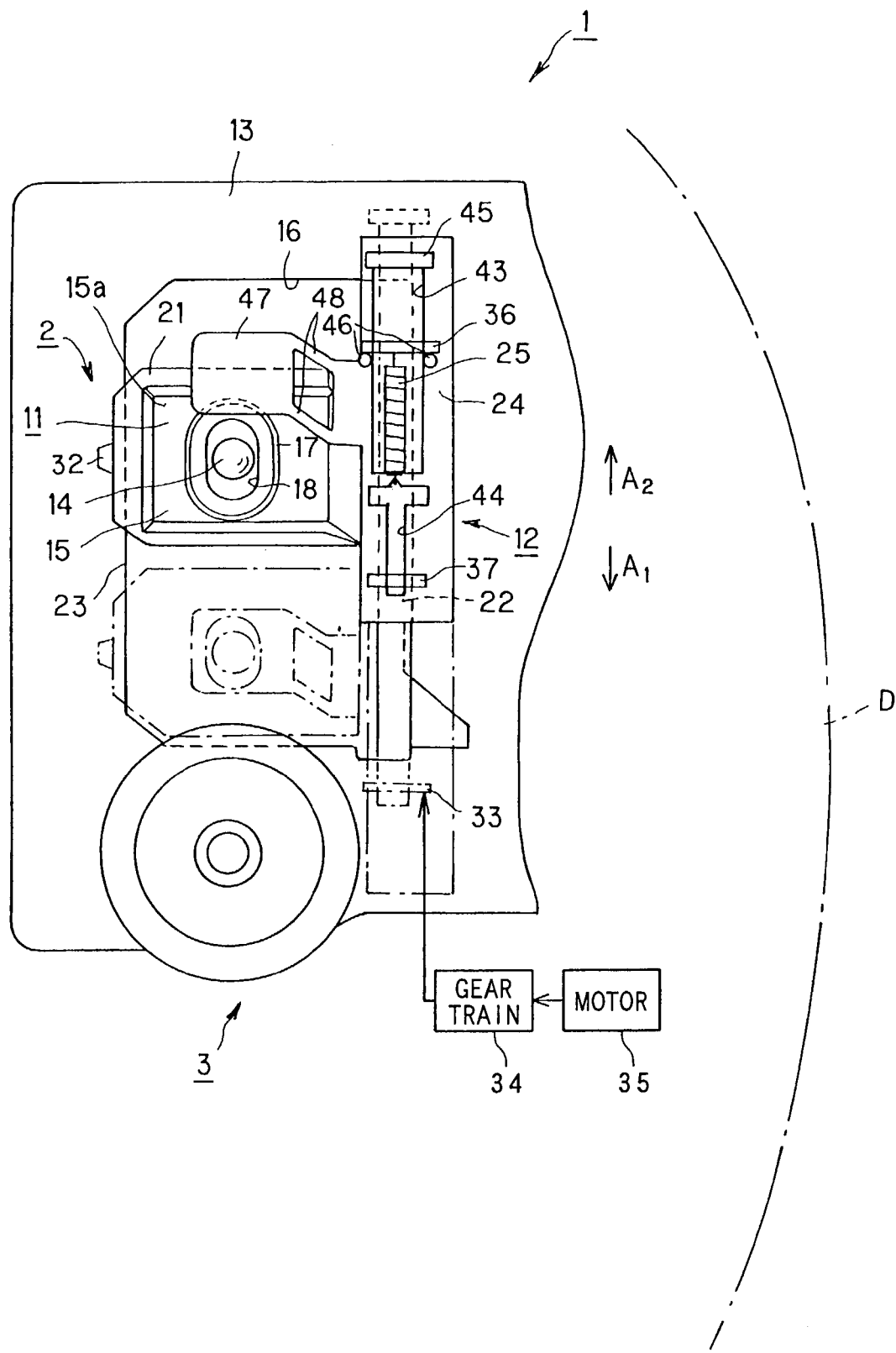
FIG. 1 is a plan view of a disc drive unit.

The disc drive unit according to the present invention is generally indicated with a reference 1 in FIG. 1. The disc drive unit 1 is directed for reading information signals from an optical disc indicated with a reference D, and more specifically, from a so-called compact disc (CD) and digital versatile disc (DVD). The optical disc D has recorded in a lead-in area (at the inner circumference side) thereof outside and around the lead-in area TOC (table of contents) which is data for management of address information etc. indicative of data locations where the data are recorded, and in a program area thereof information signals such as video data, image data, audio data, computer program, processing data to be processed by a computer, etc. A lead-out area is provided outside and around the program area. An optical pickup provided in the disc drive unit 1 reads the information signals recorded in each recording area while being moved from the inner to outer circumference of the optical disc D.

The above disc drive unit 1 includes an optical pickup mechanism 2 to write and read information to and from the optical disc D, and a disc drive mechanism 3 to rotate the optical disc D.

The optical pickup mechanism 2 includes an optical pickup 11 to read information signals from the optical disc D, a moving mechanism 12 to move the optical pickup 11 radially of the optical disc D, and a base 13 having the optical pickup 11 mounted thereon to be movable radially of the optical disc D.

Figure 2:
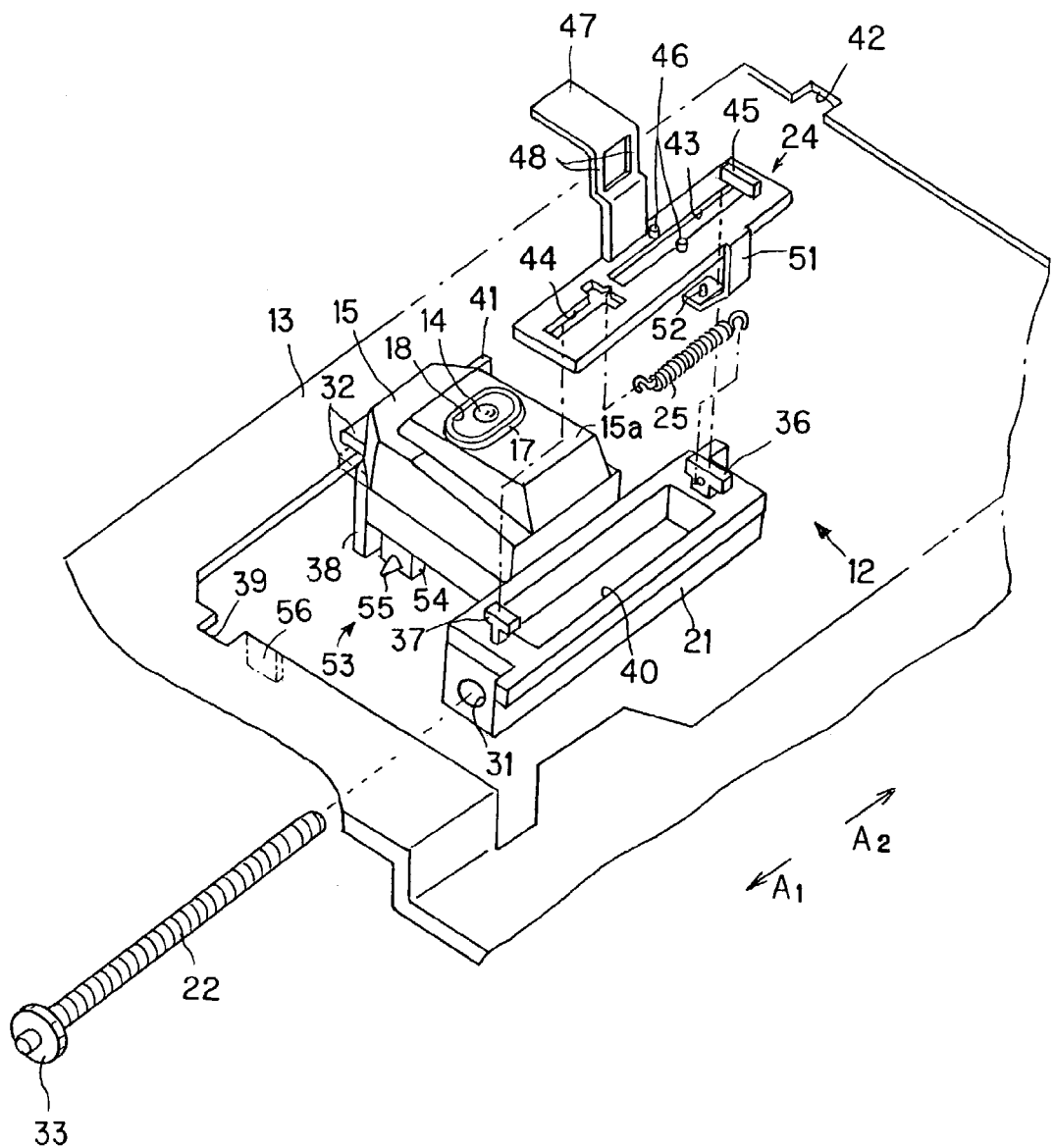
FIG. 2 is an exploded perspective view of the disc drive unit.

As shown in FIGS. 1 and 2, the base 13 has formed therein an opening 16 in which the optical pickup 11 is provided movably from the inner to outer circumference, or vice versa, of the optical disc D, that is, in the directions of arrows $A_1$ and $A_2$ in FIGS. 1 and 2. The optical pickup 11 consists an optical system block in which a light beam emitted from a semiconductor laser (light source) is focused by an objective lens 14 on the signal recording surface of the optical disc D and a return light from the signal recording surface of the optical disc D is detected by a photodetector, and an objective lens driving block which moves the objective lens 14 optical-axially of the latter (focusing direction) and in a direction orthogonal to the optical axis of the objective lens 14 (tracking direction). These optical system block and objective lens driving block are provided inside a cover 15.

The cover 15 is formed from a resin material such as ABS in the general shape of a box whose main surface 15a is generally parallel to the signal recording surface of the optical disc D. As will be seen from FIGS. 1 and 2, the cover 15 has formed nearly in the center of the main surface 15a an opening 18 through which the objective lens 14 supported by a lens holder can face directly the signal recording surface of the optical disc D and also face outside. The opening 18 has a generally elliptic shape of which the longer diameter extends radially of the optical disc D. On the main surface 15a of the cover 15, there is formed a projection 17 around the opening 18. The projection 17 is higher than the top of the objective lens 14. Since the projection 17 is formed higher than the top of the objective lens 14, so a shutter which will be described in detail later will not touch the top of the objective lens 14 when the shutter moves to mask or unmask the objective lens 14. Therefore, the objective lens 14 will not be scratched by the shutter.

Figure 3:
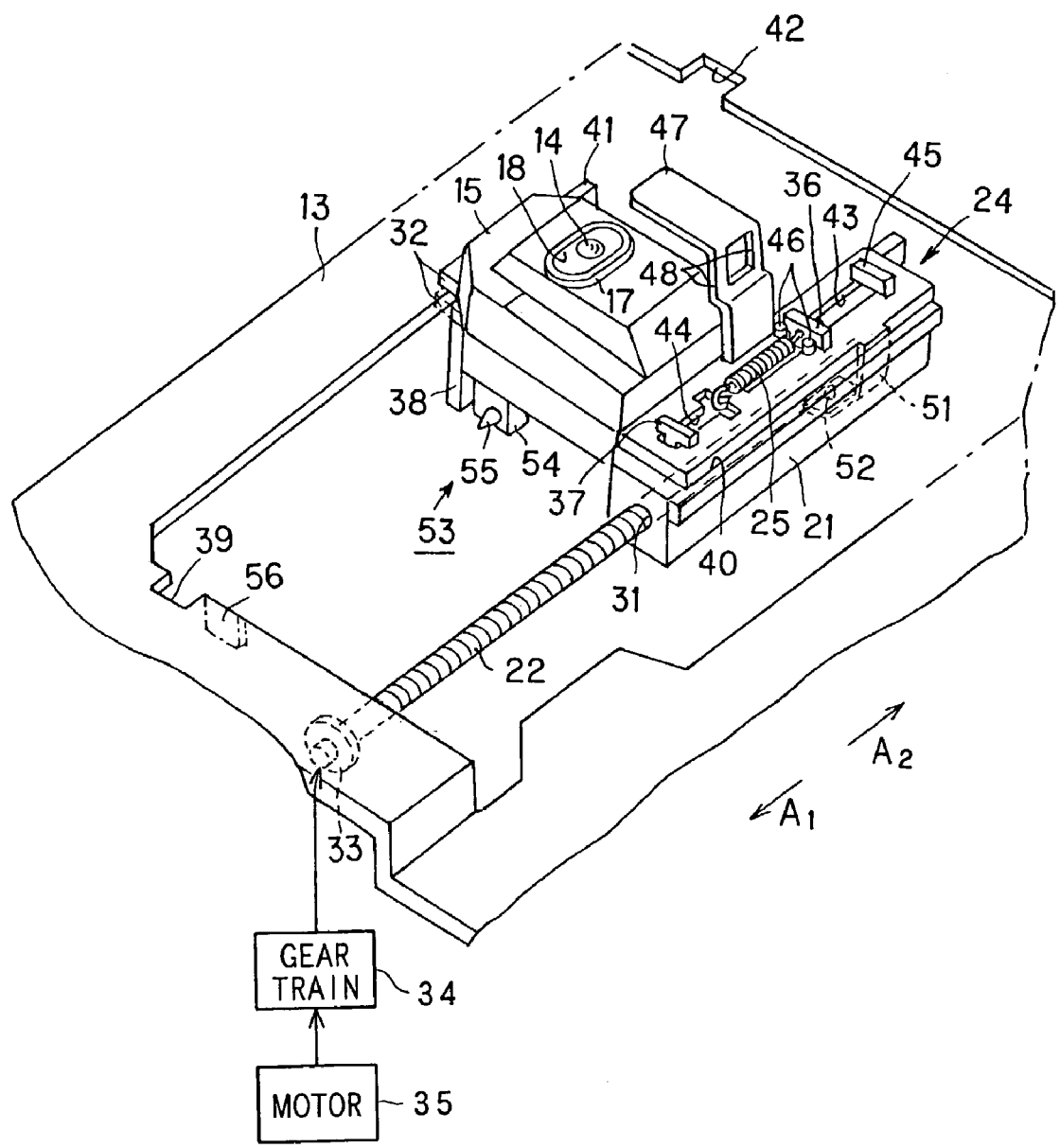
FIG. 3 is a perspective view of an optical pickup moving mechanism in an embodiment of the optical pickup device according to the present invention.

As shown in FIGS. 2 and 3, the moving mechanism 12 by which the optical pickup 11 constructed as above is moved radially of the optical disc D includes a support member 21 to support the optical pickup 11, a feed screw 22 to move the support member 21 having the optical pickup 11 mounted thereon radially of the optical disc D, a guide 23 to guide the support member 21 when moving the support member 21 along with the optical pickup 11 radially of the optical disc D, a sliding member 24, mounted on the support member 21 and connected to the feed screw 22, to move the support member 21 radially of the optical disc D, and a coil spring 25 to connect the support member 21 and sliding member 24 to each other.

As shown in FIGS. 2 and 3, the support member 21 has the optical pickup 11 mounted on the main surface thereof. It has a through-hole 31 formed in a lower portion thereof and through which the feed screw 22 is penetrated, and a pair of guide pieces 32 provided at the lateral side thereof and engaged a guide 23 formed along a lateral edge, parallel to the moving direction of the optical pickup 11, of the opening 16 formed in the base 13.

The feed screw 22 inserted in the through-hole 31 is an externally threaded metal rod. It extends in the moving direction of the optical pickup 11 and is supported rotatably in a support provided on the rear side of the base 13. As shown in FIGS. 1 and 2, the feed screw 22 has provided at one end thereof a gear 33 which is connected to a drive motor 35 by a gear train 34 including a plurality of gears. The support member 21 has formed therein an opening 40 through which the feed screw 22 through the through-hole 31 is exposed to outside at a middle portion thereof.

The guide pieces 32 in pair provided at the lateral side of the optical pickup 11 are engaged on the guide 23 provided at the lateral edge of the opening 16 in the base 13. Namely, the guide 23 is laid between the guide pieces 32, and thus guides the support member 21 being moved in the directions of arrows $A_1$ and $A_2$ in FIG. 2, namely, radially of the optical disc D. It also holds the support member 21 to prevent the optical pickup 11 from bumping when a vibration or the like is applied in a direction orthogonal to the main surface of the base 13.

The support member 21 has provided at one end thereof nearer to the outer circumference of the optical disc D a retainer 36 to which the coil spring 25 is hooked, and at the other end thereof nearer to the inner circumference of the optical disc D a guide piece 37 to guide the sliding member 24 being slid. It should be noted that the retainer 36 also guides the sliding member 24 being slid.

As shown in FIGS. 2 and 3, the support member 21 has provided in a position nearer to the inner circumference of the optical disc D a stopper 38 to prevent the support member 21 from colliding against the disc drive mechanism 3 due to having moved excessively in the direction of arrow $A_1$ in FIG. 2. The inner circumference-side stopper 38 is projected from the lateral side of the support member 21 nearer to the inner circumference of the optical disc D. On the other hand, the base 13 is cut (indicated at a reference 39) at the lateral edge, near the disc drive mechanism 3, of the opening 16 in which the optical pickup 11 is moved. When the support member 21 is moved toward the center of the optical disc D, the inner circumference-side stopper 38 comes into the cut 39 and abuts the inner end of the cut 39 to limit the inward movement of the support member 21. Thus, the cut 39 will also be called "inward move limit cut 39".

As shown in FIGS. 2 and 3, the support member 21 has also provided in a position corresponding to the outer circumference of the optical disc D a stopper 41 to prevent the support member 21 from colliding against the disc drive mechanism 2 due to having moved excessively in the direction of arrow $A_2$ in FIG. 2. On the other hand, the base 13 is cut (indicated at a reference 42) at the lateral edge opposite to the lateral edge, in which the inward move limit cut 39 is formed, namely, nearer to the outer circumference of the optical disc D, of the opening 16 in which the optical pickup 11 is moved. When the support member 21 is moved away from the center of the optical disc D, the outer-circumference stopper 41 comes into the cut 42 and abuts the inner end of the latter to limit the outward movement of the support member 21. The cut 42 will also be called "outward move limit cut 42". Thus, the optical pickup 11 supported on the support member 21 is limited in disc-radial movement between the inner circumference-side stopper 38 arriving at the inward move limit cut 39 and the outer-circumference stopper 41 arriving at the outward move limit cut 42.

As shown in FIGS. 2 and 3, the sliding member 24 mounted on the support member 21 is a generally rectangular plate having first and second guide holes 43 and 44 formed therein longitudinally thereof, namely, axially of the feed screw 22. These guide holes 43 and 44 guide the sliding member 24 being slid. The retainer 36 of the support member 21 to which the coil spring 25 is hooked is engaged in the first guide hole 43. The sliding member 24 has provided thereon at an end of the first guide hole 43 in the direction of arrow $A_2$ in FIG. 2 a limiter 45 on which the retainer 36 engaged in the first guide hole 43 is put into abutment to prevent the sliding member 24 from sliding excessively toward the inner circumference of the optical disc D. In addition, the sliding member 24 has provided thereon at the middle of and across the first guide hole 43 a pair of projections 46 the retainer 36 engaged in the first guide hole 43 abuts to prevent the sliding member 24 from moving excessively toward the outer circumference of the optical disc D.

The second guide hole 44 has the guide piece 37 of the support member 21 engaged therein and works along with the first guide hole 43 to limit the movement of the sliding member 24. The coil spring 25 is hooked at the other end thereof to the end of the second guide hole 44 in the direction of arrow $A_2$ in FIG. 2. Thus, with the retainer 36 of the support member 21 being engaged in the first guide hole 43 and the guide piece 37 being engaged in the second guide hole 44, the sliding member 24 connected to the support member 21 by the coil spring 25 is normally forced under the force of the coil spring 25 in the direction of arrow $A_2$ toward the outer circumference of the optical disc D while the projections 46 are in abutment on one side of the retainer 36.

The sliding member 24 has provided thereon a shutter 47 which masks the objective lens 14 provided in the opening 18 in the cover 15 of the optical pickup. 11. As the sliding member 24 is slid, the shutter 47 is moved to a position where it unmasks the objective lens 14 or to a position where it masks the objective lens 14. That is, when playing the optical disc D, the shutter 47 is moved in the direction of arrow $A_2$ in FIGS. 1 thru 3 to unmask the objective lens 14. Otherwise, the shutter 47 is slid in the direction of arrow $A_1$ in FIGS. 1 thru 3 to mask the objective lens 14. The shutter 47 is formed from a resin material such as POM (polyoxymethylene) to have a generally rectangular shape and an area large enough to mask the opening 18 in the cover 15 as shown in FIG. 2. As shown in FIG. 2, the shutter 47 is formed integrally with the sliding member 24 with a pair of linear, elastic coupling pieces 48 laid between them, and forced to over the cover 15 under the elasticity of the coupling pieces 48. It should be noted that the projection 17 is formed around the objective lens as previously mentioned and since the projection 17 is formed higher than the top of the objective lens 14, so the shutter 47 will not touch the top of the objective lens 14 but the projection 17 when the shutter 47 is in the position of masking the objective lens 14.

Figure 4:
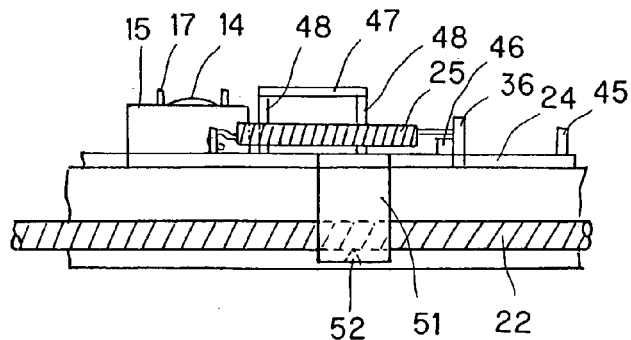
FIG. 4 is a side elevation of a moving mechanism included in the optical pickup device.

The sliding member 24 has a transmission 51 extending from above to under the feed screw 22 in a wraparound relation to the latter as best shown in FIGS. 2 and 4. The transmission 51 is engaged on the lower side of the feed screw 22. The transmission 51 has formed at the free end thereof an engagement projection 52 engaged in the thread of the feed screw 22 exposed to outside at the middle portion thereof through the opening 40 in the support member 21. The transmission 51 is formed from an elastic material such as a leaf spring. It is fixed to the sliding member 24 to be movable along with the latter. The transmission 51 may be formed integrally with the sliding member 24. The engagement projection 52 of the transmission 51 is always in mesh with the thread of the feed screw 22 under the elasticity of the transmission 51 itself. Thus, as the feed screw 22 is rotated, the sliding member 24 having mounted thereon the transmission 51 which converts a rotation of the feed screw 22 into a linear motion is slid in the directions of arrows $A_1$ and $A_2$ in FIGS. 1 thru 3 to move the shutter 47 to the position where the objective lens 14 is unmasked or to the position where the objective lens 14 is masked.

As mentioned above, the coil spring 25 is hooked at one end thereof to the retainer 36 of the support member 21 and at the other end to the end of the second guide hole 44. The coil spring 25 forces the sliding member 24 in the direction of arrow $A_2$ in FIGS. 2 and 3 for the shutter 47 to unmask the objective lens 14 and also connects the sliding member 24 and support member 21 to each other. Therefore, when the sliding member 24 is driven to slide in the directions of $A_1$ and $A_2$ in FIGS. 2 and 3 as the feed screw 22 is rotated, the support member 21 having the optical pickup 11 mounted thereon is correspondingly moved radially of the optical disc D. Thus, the coil spring 25 connecting the support member 21 and sliding member 24 to each other has such a force as not to cause the support member 21 having the optical pickup 11 mounted thereon to be misaligned with the sliding member 24 due to a quick movement of the optical pickup 11 for a jump from one track to another or the like.

Further, as shown in FIG. 2, the moving mechanism 12 includes a detection mechanism 53 to detect when the optical pickup 11 has been moved to the lead-in area of the optical disc D. The detection mechanism 53 is composed of a detection switch or limit switch 54 fixed to the support member 21 and a switch counterpart 56 to push a sense piece 55 of the detection switch 54.

The detection switch 54 is fixed to the support member 21 with the sense piece 55 thereof directed toward the inner circumference of the optical disc D as shown in FIG. 2. The switch counterpart 56 is provided on the lateral edge, at the side of the disc rotation drive mechanism 3, of the opening 16 in which the optical pickup 11 is moved. More particularly, when the optical pickup 11 is moved nearly to the center of the lead-in area for reading TOC on the optical disc D, the sense piece 55 of the detection switch 54 is pressed to the switch counterpart 56, whereby it is detected that the optical pick 11 is located in a reading position in the lead-in area of the optical disc D.

Figure 5:
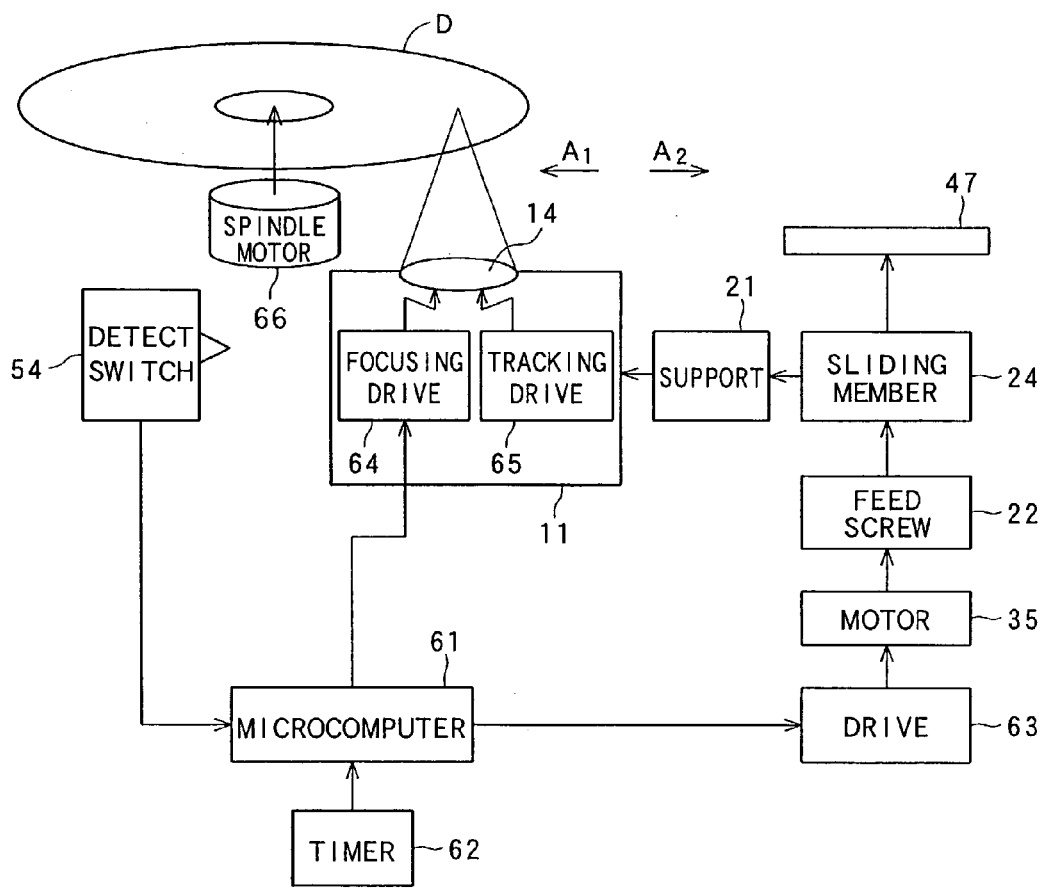
FIG. 5 explains the control of the moving mechanism.

More particularly, a detection signal produced by the detection switch 54 is supplied to a microcomputer 61 as shown in FIG. 5. Upon reception of the detection signal, the microcomputer 61 will start counting a predetermined length of time by a timer 62 and supply, for the length of time, a drive circuit 63 for a drive motor 35 with a drive signal which drives the drive motor 35 to rotate the feed screw 22. Thus, the drive motor 35 continuously drives the feed screw 22 for the length of time the microcomputer 61 counts. Since the support member 21 with the optical pickup 11 mounted thereon is limited in position with the inner circumference-side stopper 38 abutting the inward move limit cut 39 in the base 13, so the sliding member 24 will be moved in the direction of arrow $A_1$ in FIG. 5 against the force of the coil spring 25 and hence the shutter 47 mask the objective lens 14.

For the shutter 47 to mask the objective lens 14, the microcomputer 61 will apply a reverse bias voltage for moving the objective lens 14 away from the optical disc D to a focusing drive 64 which controls focusing of the objective lens 14 for a predetermined period in order to prevent the objective lens 14 from touching the shutter 47. The focusing drive 64 moves the objective lens 14 in the focusing direction under the action of a magnetic field developed by a magnet and a current flowing through a focusing coil. Thus, the microcomputer 61 moves the objective lens 14 in a direction further away from the optical disc D from a position where the objective lens 14 stays when the apparatus is turned off.

As shown in FIGS. 1 and 5, the disc rotation drive mechanism 3 includes a spindle motor 66 to rotate the optical disc D. The spindle motor 66 is fixed to the base 13 and has provided on the drive shaft thereof a disc table included in the disc drive and on which the optical disc D is set. The spindle motor 66 drives to rotate the optical disc D set on the disc table at a constant linear velocity, for example.

The disc drive unit 1 constructed as above operates as will be described below. First, at a time t1 in FIG. 6, the disc drive unit 1 is reading information signals recorded in the program area of the optical disc D. It should be noted here that the disc drive unit 1 is capable of playing a CD and DVD different in working distance from each other. For playing a CD, the focusing drive 64 moves the objective lens 14 from a reference position where no voltage is applied to the focusing drive 64 to an in-focus position nearer to the CD than a position where the objective lens 14 focuses a light beam on the signal recording surface, as shown in FIGS. 5 and 7. Also, the focusing drive 64 is designed to move, when the CD incurs a side-runout or the like, the objective lens 14 to a focusing control position nearer to the CD than the in-focus position where focusing is controlled. That is, for playing a CD, the focusing drive 64 can focus the objective lens 14 while following such a side-runout of the disc by moving the objective lens 14 to the in-focus position or to the focusing control position.

Also, there is provided a tracking controller 65 composed of a tracking coil and magnet to move the objective lens 14 in the tracking direction under the action of a current supplied to the tracking coil and a magnetic field developed. When a CD is being played, the tracking controller 65 controls tracking of the objective lens 14 by moving the objective lens 14 in the tracking direction included in a plane orthogonal to the optical axis of the objective lens 14.

Figure 8:
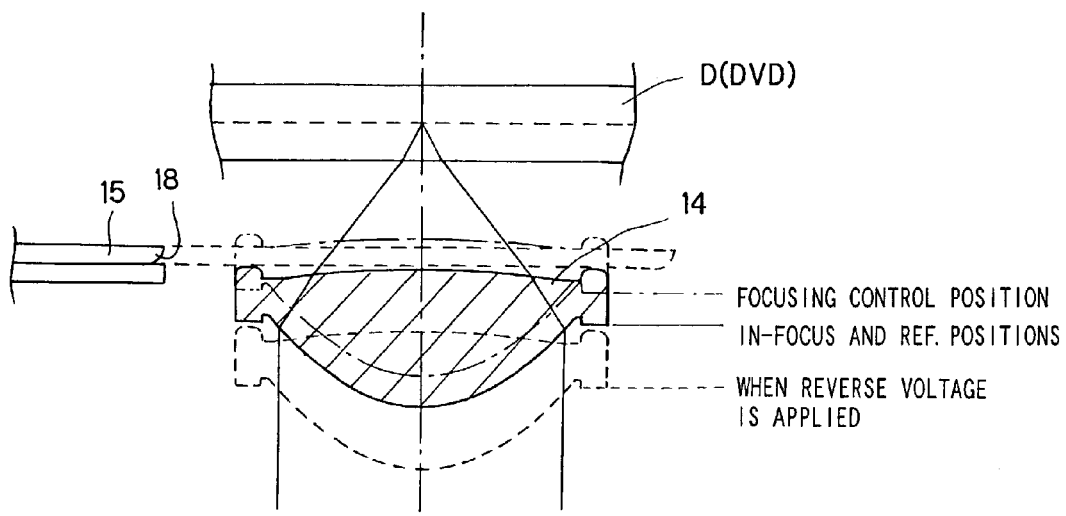
FIG. 8 explains the positions of the objective lens for playing a DVD.

Also, for playing a DVD, the focusing drive 64 moves the objective lens 14 from the reference position where no voltage is applied to the focusing drive 64 and also the objective lens 14 focuses a light beam on the signal recording surface to the focusing control position nearer to the DVD than the in-focus position where focusing control is to be made when the DVD incurs a side-runout., as shown in FIGS. 5 and 8. That is, for playing a DVD, the focusing drive 64 can focus the objective lens 14 while following such a side-runout of the disc by moving the objective lens 14 from the reference position to the focusing control position.

When a DVD is being played, the tracking controller 65 controls tracking of the objective lens 14 by moving the objective lens 14 in the tracking direction included in a plane orthogonal to the optical axis of the objective lens 14.

Thus, a return light from the signal recording surface of a CD or DVD is detected and converted into an electricity by the photodetector provided in the optical system block of the optical pickup 11.

Figure 9:
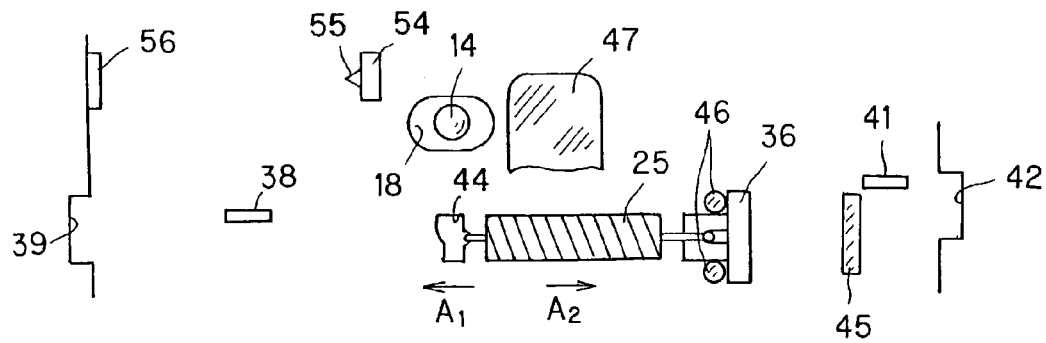
FIG. 9 explains the state of the moving mechanism with the optical disc D being played.

As mentioned above, when the optical pickup 11 plays a CD or DVD, the sliding member 24 has been slid in the direction of arrow $A_2$ in FIG. 9 under the force of the coil spring 25 in relation to the support member 21 with the projections 46 being in abutment on the retainer 36 as shown in FIG. 9. Therefore, also the shutter 47 to mask the objective lens 14 is in the position where the objective lens 14 is unmasked, and thus a light beam can be projected to the signal recording surface of the optical disc D. As information signals recorded in the program area of the optical disc D are read, the drive motor 35 rotates the feed screw 22 and the optical pickup 11 mounted on the support member 21 is correspondingly moved along with the sliding member 24 in the directions of arrows $A_1$ and $A_2$ in FIG. 9 (radially of the optical disc D). In the optical pickup 11, the objective lens 14 focuses a light beam emitted from the light source, and the photodetector detects a return light from the signal recording surface of the optical disc D and reads the information signals. At this time, since the coil spring 25 has such a force as not to cause the support member 21 with the optical pickup 11 mounted thereon to be displaced in relation to the sliding member 24 when the optical pickup 11 is quickly moved for a track jump or the like, the optical pickup 11 mounted on the support member 21 can be prevented from being misaligned with the sliding member 24 which is slid directly by the feed screw 22. It should be noted that when the optical pickup 11 is moved to the outer circumference, that is, to the lead-out area, of the optical disc D, the outer-circumference stopper 41 is put into abutment on the inner end of the outward move limit cut 42, thereby permitting to prevent the optical pickup 11 from moving excessively to the outer circumference of the optical disc D.

Figure 6:
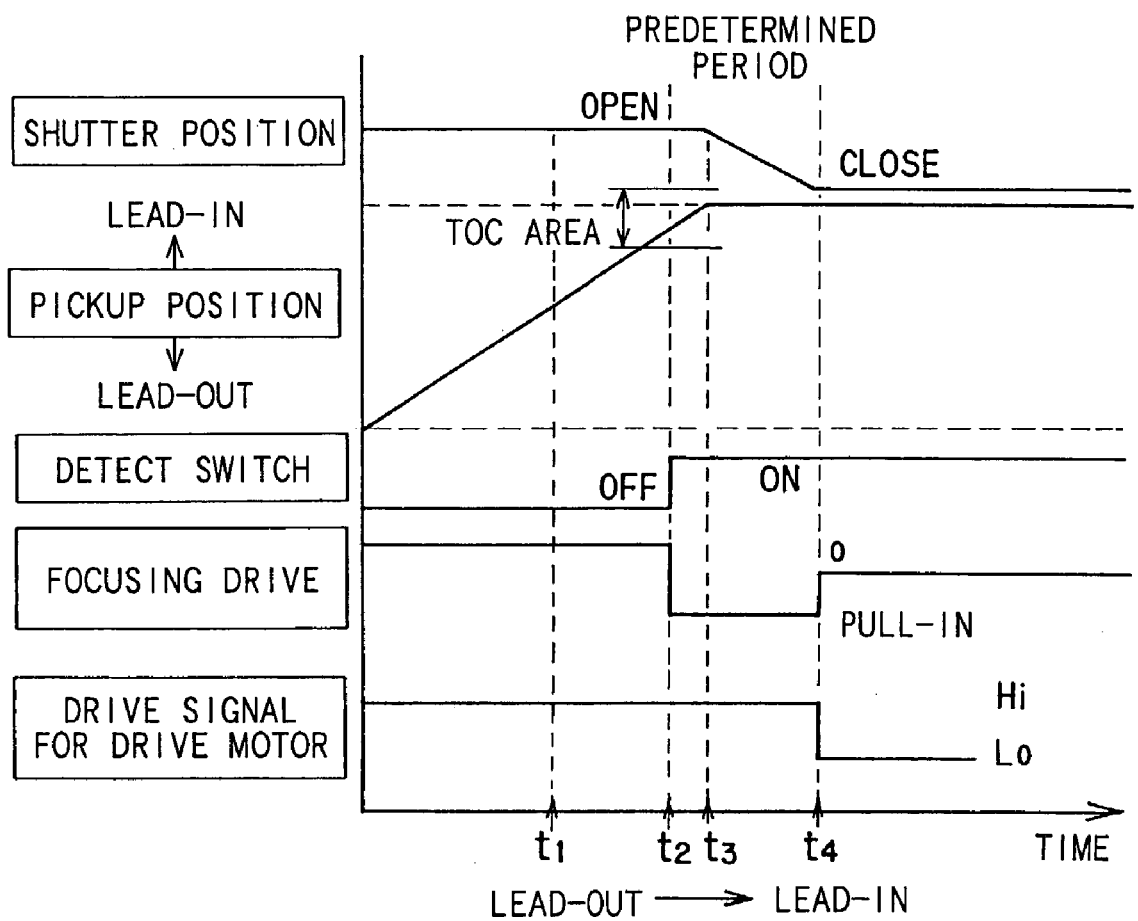
FIG. 6 explains the operation of a drive motor which rotates the feed screw for moving the optical pickup from the lead-out side to the lead-in side of an optical disc D.
Figure 7:
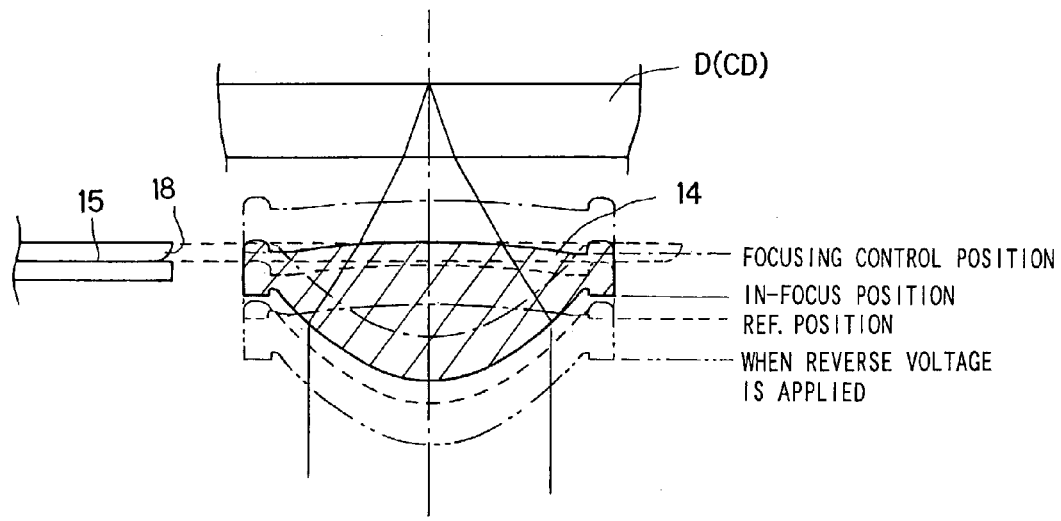
FIG. 7 explains the positions of the objective lens for playing a CD.
Figure 10:
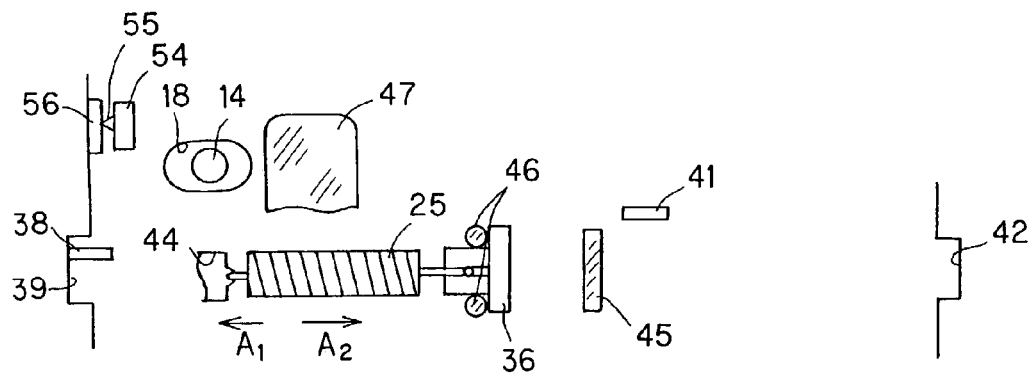
FIG. 10 explains the state of the moving mechanism with the lead-in area of the optical disc D being read.

Next, when the optical pickup 11 is moved from the inner to outer circumference, namely, to the lead-in area, of the optical disc D for ending the disc playing at a time t2 in FIG. 6, the inner circumference-side stopper 38 provided on the support member 21 abuts the inner end of the inward move limit cut 39 formed in the base 13 as shown in FIG. 10, thereby limiting the support member 21 having the optical pickup 11 mounted thereon from moving further to the inner circumference of the optical disc D. At the same time, the sense piece 55 of the detection switch 54 provided on the support member 21 is pressed by the switch counterpart 56 provided on the base 13 and thus the detection switch 54 is turned on to supply a detection signal to the microcomputer 61.

Upon reception of the detection signal from the detection switch 54, the microprocessor 61 will start counting a predetermined length of time until the shutter 47 provided on the sliding member 24 is moved to the position where it masks the objective lens 14. The inner circumference-side stopper 38 abuts the inner end of the inward move cut 39 and thus support member 21 cannot move in the direction of arrow $A_1$ in FIG. 10. As the drive motor 35 continuously drives the feed screw 22 to further rotate, the sliding member 24 will be moved against the force of the coil spring 25 in the direction of arrow $A_1$ in FI. 10. Thus, the shutter 47 provided on the sliding member 24 starts, at a time t3 in FIG. 6, moving toward the position where it will mask the objective lens 14.

Figure 11:
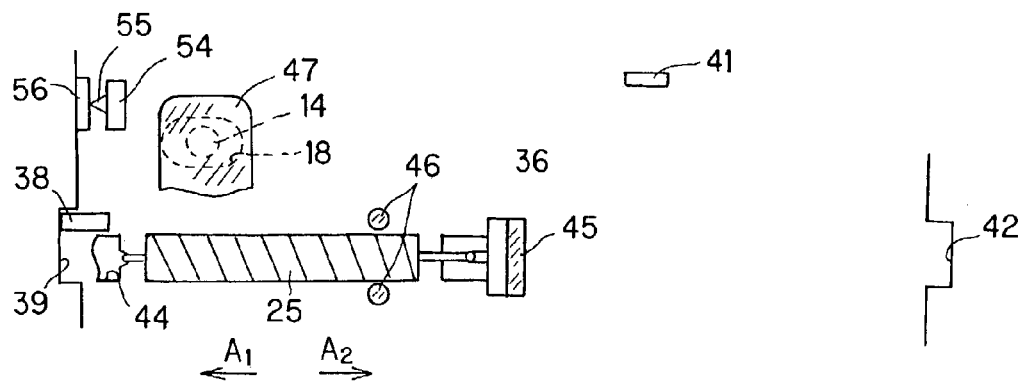
FIG. 11 explains the state of the moving mechanism with the objective lens masked with the shutter.
Figure 12:
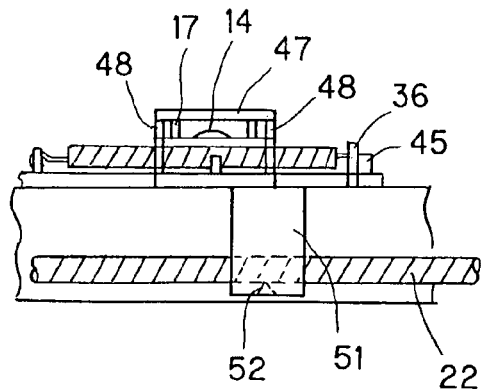
FIG. 12 is a side elevation of the moving mechanism with the shutter being in a position for masking the objective lens.

Upon elapse of the predetermined length of time, the microprocessor 61 stops, at a time t4 in FIG. 6, the drive motor 35 from running. Then the shutter 47 is moved to the position where it masks the objective lens 14, as shown in FIGS. 11 and 12 and will mask the objective lens 14. At this time, since the shutter 47 is forced by the coupling pieces 48 toward the objective lens 14, it is possible to prevent dust or the like from entering through any clearance and adhering to the objective lens 14. Thus, while the disc drive unit 1 is not in use, it is possible to prevent any foreign matter such as dust from adhering to the objective lens 14. It should be noted that since the limiter 45 abuts the other side of the retainer 36 of the support member 21, the sliding member 24 is mechanically limited from being moved.

As shown in FIG. 6, the microcomputer 61 will apply a reverse bias voltage to the focusing drive 64 for the predetermined period after the detection switch 54 is turned on at the time t2 in FIG. 6 until the time t4. Thus, the focusing drive 64 moves the objective lens 14 to a parking position, inside the cover 15, farthest from the optical disc D as shown in FIGS. 7 and 8. Therefore, it is possible to prevent the shutter 47 from touching and scratching the objective lens 14 when being moved from the position where it unmasks the objective lens 14 to the position where it masks the objective lens 14. At the time t4 when the predetermined length of time has elapsed, the microcomputer 61 will apply no voltage or apply 0 V, for example, to the focusing drive 64. Thus, the objective lens 14 is moved from the parking position back to the reference position as shown in FIGS. 7 and 8. In the reference position, the top of the objective lens 14 is lower than the top of the projection 17. Therefore, it is possible to prevent the shutter 47 from touching and scratching the objective lens 14. It should be noted that should the objective lens 14 touch the shutter 47 due to a vibration or the like, the touch is just a point contact and so the scratching of the objective lens 14 can be minimized.

Figure 13:
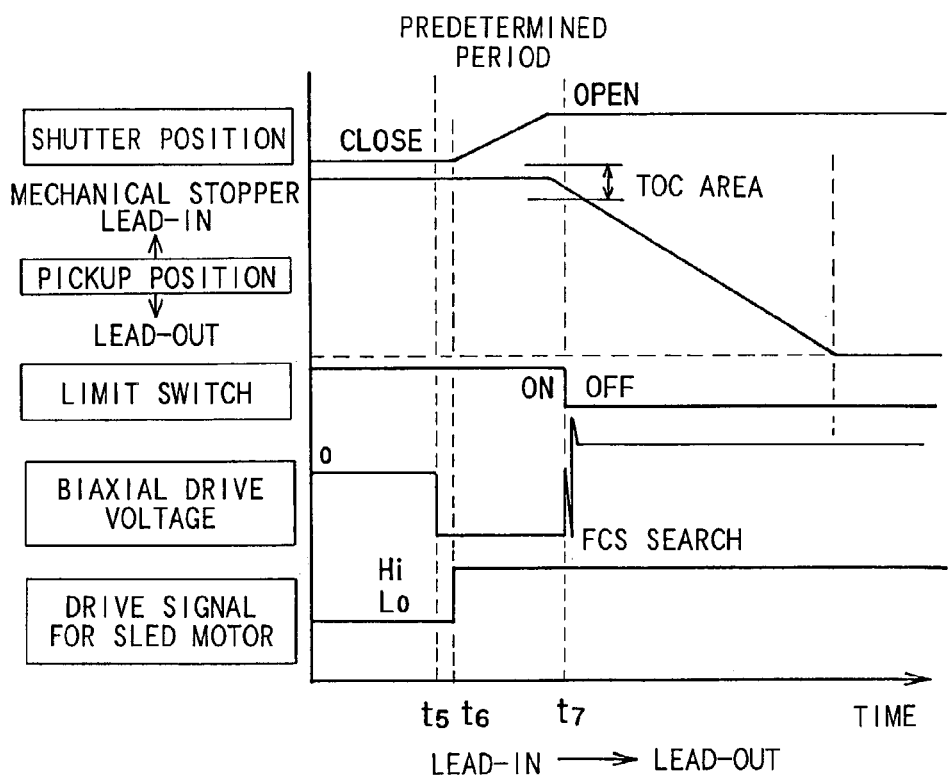
FIG. 13 explains the operation of the drive motor which rotates the feed screw for moving the optical pickup from the lead-in to lead-out side of the optical disc.

Next, the operations to start playing an optical disc D will be described with reference to FIG. 13. When a play start signal or the like is supplied to the microcomputer 61, the latter will detect, at a time t5, that the detection switch 54 is on and the optical pickup 11 is in a lead-in read position at the innermost circumference of the optical disc D. At the same time, the microcomputer 61 applies a reverse bias voltage to the focusing drive 64 to move the objective lens 14 from the reference position in FIGS. 7 and 8 to the parking position to prevent the shutter 47 from touching the objective lens 14 when the shutter 47 moves from the position where it masks the objective lens 14 to the unmasking position. Next, at a time t6, the microcomputer 61 turns on the drive motor 35 to rotate the feed screw 22. Thus, the sliding member 24 connected to the feed screw 22 by the transmission 51 will start moving in the direction of arrow $A_2$ in FIG. 11. That is, the shutter 47 mounted on the sliding member 24 starts moving from the position where it masks the objective lens 14 to the unmasking position.

When the sliding member 24 has moved in the direction of arrow $A_2$ in FIG. 11 and the shutter 47 has moved to the position where it unmasks the objective lens 14, the detection switch 54 is turned off at a time t7 as shown in FIG. 10. Detecting that the detection switch 54 is off, the microcomputer 61 will pull in the objective lens 14 so that the optical pickup 11 can read information signals, particularly, TOC, recorded in the lead-in area of the optical disc D. That is, the focusing drive 64 is applied with a reverse bias voltage and bias voltage. Thus, the objective lens 14 is moved to the focusing control position, parking position and then to the in-focus position as shown in FIGS. 7 and 8. Thereafter, the moving mechanism 12 will be ready as shown in FIG. 9 for reading the information signals recorded in the optical disc D. At this time, the optical pickup 11 is located nearly in the center of the lead-in area of the optical disc D, and hence TOC can readily be read without having to make any operations for moving the optical pickup 11.

The disc drive unit 1 having been described so far needs no compartment for housing the optical pickup 11 when not in use as in the conventional disc drive units in order to prevent any foreign matter such as dust from adhering to the objective lens 14 of the optical pickup 11. In the aforementioned disc drive unit 1 according to the present invention, the shutter 47 is moved by the feed screw 22 which moves the optical pickup 11 radially of the optical disc D to mask or unmask the objective lens 14, whereby it is possible to design the optical pickup 11 compact and simple and prevent any foreign matter such as dust from adhering to the objective lens 14. Also, the disc drive unit 1 can use the feed screw 22, such as used in many small portable devices, in the moving mechanism 12 which feeds the optical pickup 11 radially of the optical disc D and also the shutter 47 which prevents any foreign matter such as dust from adhering to the objective lens 14. Since the objective lens 14 is moved away from the optical disc D when moving the shutter 47 to mask or unmask the objective lens 14, it is possible to prevent the shutter 47 from touching and scratching the objective lens 14.

Note here that the reverse bias voltage may be applied to the focusing drive 64 only when the objective lens 14 is masked or unmasked by the shutter 47 and the objective lens 14 may be pulled in to the parking position as in an optical pickup mechanism which will be described herebelow.

Figure 14:
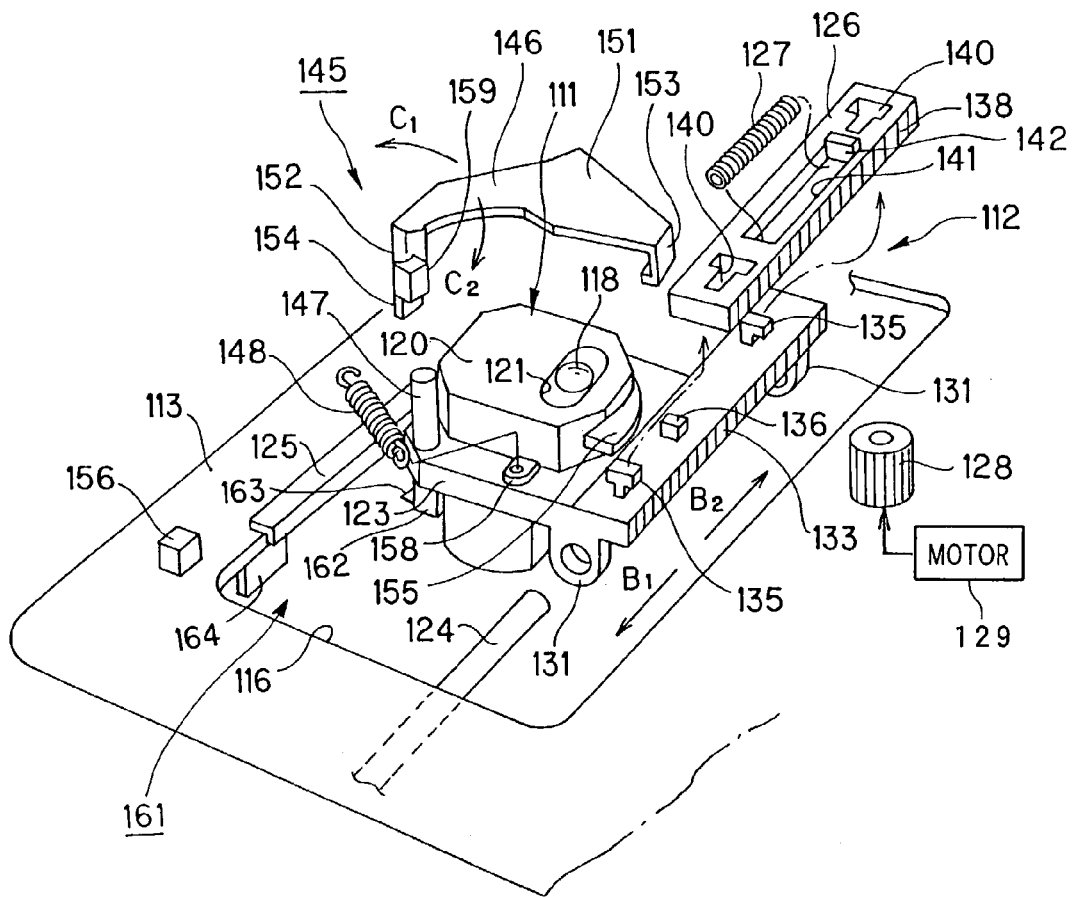
FIG. 14 is an exploded perspective view of another embodiment of the optical pickup device according to the present invention.

Referring now to FIG. 14, there is illustrated in the form of an exploded perspective view another embodiment of the optical pickup device according to the present invention. This optical pickup device or mechanism is generally indicated with a reference 110. As shown in FIG. 14, the optical pickup mechanism 110 includes an optical pickup 111 to read information from an optical disc D, a moving mechanism 112 to move the optical pickup 111 radially of the optical disc D, and a base 113 to support the optical pickup 111 movably and also the moving mechanism 112.

As shown in FIG. 14, the optical pickup 111 is provided movably in the directions of arrows $B_1$ and $B_2$ in FIG. 14 in an opening 116 formed in the base 113. The optical pickup 111 has an optical system (not shown) including an objective lens 118, a drive unit (not shown) which moves the objective lens 118 optical-axially of the latter and in a direction orthogonal to the optical axis, and a cover 120 to cover the drive unit.

The optical system includes a light source to emit a laser light, a group of lenses forming together an optical path, and a photodetector to detect a return light from the optical disc D (which are not shown). Also, the drive unit includes a lens holder to hole the objective lens 118, a support mechanism to support the lens holder movably, and an electromagnetic circuit to drive the lens holder electromagnetically (which are not shown). The cover 120 is formed from a resin material, for example, to have a nearly box-like shape, as shown in FIG. 14 and has formed therein a generally rectangular opening 121 through which the optical pickup 118 faces the optical disc D.

As shown in FIG. 14, the moving mechanism 112 includes a support member 123 to support the optical pickup 111, a guide shaft 124 to support the support member 123 to be movable radially of the optical disc D, a guide 125 to guide the support member 123 being moved, a sliding member 126 to carry the support member 123, a coil spring 127 to force the sliding member 126 axially of the guide shaft 124 in relation to the support member 123, a drive gear 128 to drive the sliding member 126, and a drive motor 129 to rotate the drive gear 128.

Figure 15:
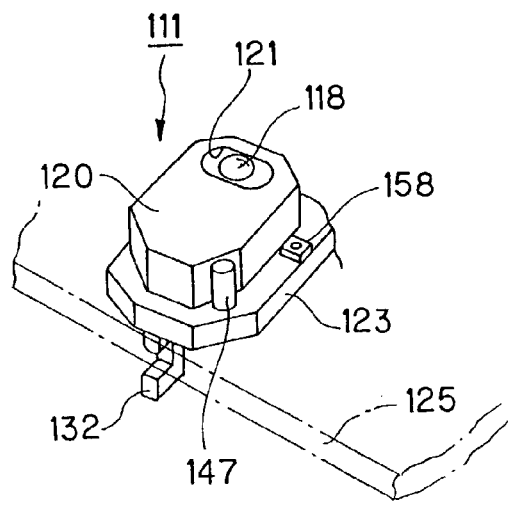
FIG. 15 is a perspective view explaining a support member included in the optical pickup device.

As shown in FIGS. 14 and 15, the support member 123 has the optical pickup 111 mounted on the main surface thereof. It has also formed thereon a pair of holders 131 each having formed therein a through-hole through which the guide shaft 124 is movably penetrated. The support member 123 further has a guide recess portion 132 slidably engaged on the guide 125. The support member 123 has formed integrally at one end thereof a rack 133 which is movable in mesh with the drive gear 128.

The rack 133 is formed parallel to the axis of the guide shaft 124 as shown in FIG. 14. The rack 133 has a pair of engagement pieces 135 engaged in the sliding member 126, and a retainer 136 to which the coil spring 127 is hooked at one end thereof.

As shown in FIG. 14, the guide shaft 124 is disposed across the opening 116 formed in the base 113 with the axis thereof being parallel to the radius of the optical disc D. It is fixed at opposite ends thereof to the base 113 with fixtures (not shown), respectively.

The guide 125 is formed from a resin material to have a linear shape as shown in FIG. 14. It is formed parallel to the axis of the guide shaft 124 and along one lateral edge of the opening 116 in the base 113. The guide 125 has slidably engaged thereon the guide recess portion 132 of the support member 123 as shown in FIG. 15.

Figure 16:
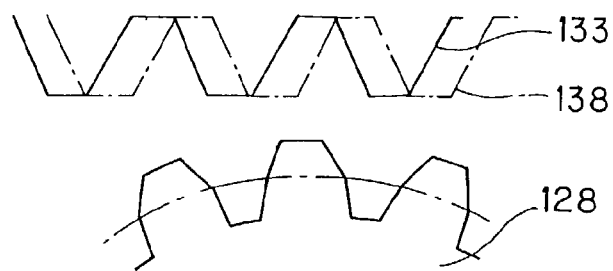
FIG. 16 is a plan view explaining a rack of the support member and rack of the sliding member, included in the optical pickup device.

As shown in FIG. 16, the sliding member 126 has a rack 138 formed thereon parallel to the axis of the guide shaft 124. The sliding member 126 is installed with the rack 138 staggered about a half of one tooth thickness in relation to the rack 133 of the support member 123. The sliding member 126 has formed therein a pair of engagement holes 140 in which engagement pieces 135 formed on the rack 133 of the support member 123 are engaged as shown in FIG. 14. Also, the sliding member 126 has formed nearly in the center of the main surface thereof an opening 141 in which the coil spring 127 is disposed. There is formed at one end of the opening 141 a retainer 142 on which the coil spring 127 is engaged at the other end thereof.

As shown in FIG. 14, the coil spring 127 is engaged at one end thereof on the retainer 136 provided on the rack 133 of the support member 123 and at the other end on the retainer 142 provided on the sliding member 126. The coil spring 127 forces, by its elasticity, the sliding member 126 in the direction of arrow $B_1$ parallel to the axis of the guide shaft 124 in relation to the rack 133 of the support member 123. Thus, the coil spring 127 forces the rack 133 of the support member 123 and rack 138 of the sliding member 126 to the drive gear 128 in a direction of canceling the backlash. That is, since the coil spring 127 forces the racks 133 and 138 with the rack 138 kept staggered about the half of one tooth thickness in relation to the rack 133 as mentioned above, so no backlash will take place when the two racks 133 and 138 of the support member 123 and sliding member 126, respectively, are moved toward the outer- or inner-circumference side as driven by the drive gear 128 with which the racks are in mesh, so that the support member 123 and sliding member 126 can be moved with a high accuracy.

As shown in FIG. 14, the optical pickup mechanism 110 has also a shutter mechanism 145 including a shutter 146 disposed movably to a masking position where it will mask the side of the objective lens 118 in the optical pickup 111, opposite to the optical disc D, and to an unmasking position where it will unmask the objective lens 118. The shutter 146 is intended to prevent dust in an air flow inside the apparatus from adhering to the face of the objective lens 118, opposite to the optical disc D, when the apparatus is in a waiting state for playing.

Figure 17:
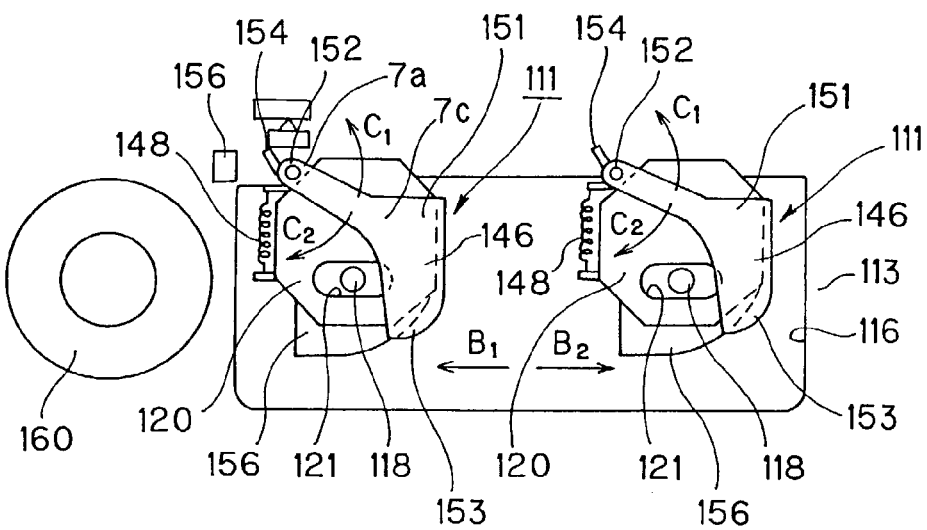
FIG. 17 is a plan view of a shutter mechanism included in the optical pickup device with the shutter being opened.

As shown in FIGS. 14 and 17, the shutter mechanism 145 includes the shutter 146 to mask the objective lens 118, a pivot 147 support the shutter 146 pivotably, and a tension coil spring 148 to force the shutter 146 to a position where it will unmask the objective lens 118.

As shown in FIG. 14, the shutter 146 consists of a shutter portion 151 to mask the opening 121 in the cover 120 of the optical pickup 111, a pivot support portion 152 to support the pivot 147 pivotably, a guide portion 153 engaged slidably on the cover 120 to guide the shutter portion 151, and an actuator portion 154 to pivot the shutter portion 151 in the directions of arrows $C_1$ and $C_2$ in FIG. 14.

The shutter portion 151 is formed to have a generally plate-like shape, and slides above the cover 120 to mask or unmask the opening 121 in the cover 120. The pivot support portion 152 is formed integrally at one end of the shutter portion 151 and has formed therein a shaft hole in which the pivot 147 is pivotably inserted. The guide portion 153 is formed to have a generally C-like section, and slidably engaged on a generally circular guide piece 155 formed projected from and integrally with the perimeter of the cover 120. The actuator portion 154 is formed in a position, on the pivot support portion 152, where it faces an actuating projection 156 provided on the base 113 as shown in FIG. 14. When the optical pickup 111 is moved to the innermost circumference of the recording area, that is, to the lead-in area of the optical disc D, the actuator portion 154 abuts the actuating projection 156 to pivot the pivot support portion 152 about the axis of the pivot 147.

The pivot 147 is provided erected on the support member 123 and pivotably inserted in the pivot hole in the pivot support 152 of the shutter 146. As will be seen from FIG. 14, the tension coil spring 148 is hooked at one end thereof to a retainer 158 provided on the support member 123 and at the other end to a retainer 159 formed on the pivot support portion 152 of the shutter 146.

Further, the moving mechanism 112 has a detection mechanism 161 to detect when the optical pickup 111 has moved to the lead-in area of the optical disc D, as shown in FIG. 14. The detection mechanism 161 is composed of a detection or limit switch 162 to detect that the optical pickup 111 is in a position for reading the lead-in area of the optical disc D, and a switch counterpart 164 to push a sense piece 163 of the detection switch 162.

The detection switch 162 is installed to the support member 123 with the sense piece 163 directed orthogonally to the moving direction of the optical pickup 111. Also, the switch counterpart 164 is formed projected from and integrally with the base 113 to extend in the moving direction of the optical pickup 111. More specifically, when the optical pickup 111 has moved nearly to the center of the lead-in area to read TOC of the optical disc D, the sense piece 163 of the detection switch 162 is pushed by the switch counterpart 164 and thus the detection switch 162 detects that the optical pickup 111 is in the position for reading the lead-in area of the optical disc D.

As having previously been described with reference to FIG. 5, a detection signal produced by the detection switch 162 is supplied to the microcomputer 61. Then, the microcomputer 61 will start counting a predetermined length of time by the timer 62. The drive motor 129 drives the support member 123 for the predetermined length of time to move the shutter 146 from the unmasking position to the masking position.

On the base 113, there is disposed a disc rotation drive mechanism to rotate the optical disc D. The disc rotation drive mechanism is composed of a disc table 160 on which the optical disc D is set, and a spindle motor (not shown) to rotate the disc table 160, as shown in FIG. 17.

In the optical pickup mechanism 110 constructed as above, when reading information from the optical disc D, the support member 123 is moved by the moving mechanism 112 along the guide shaft 124 and guide 125 and thus the optical pickup 111 is moved radially of the optical disc D.

Figure 18:
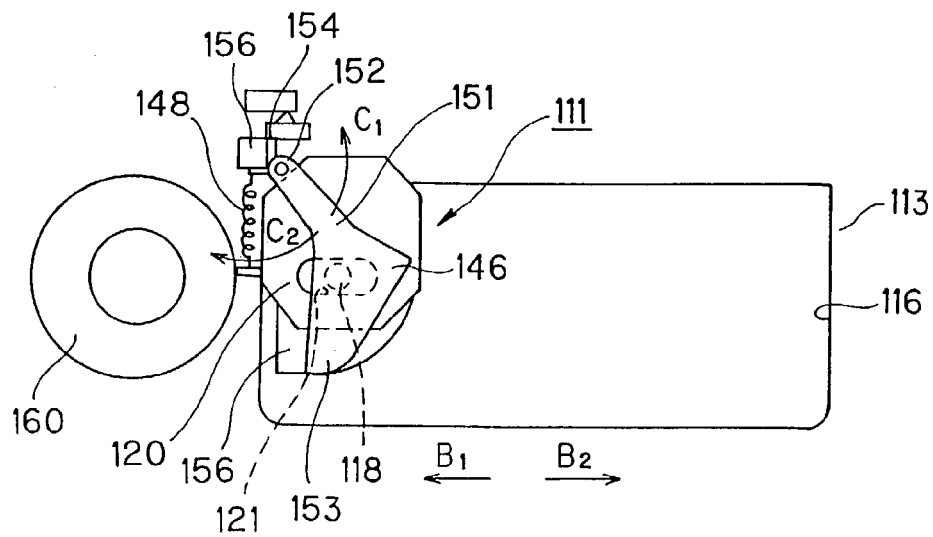
FIG. 18 is a plan view of the shutter mechanism with the shutter being closed.

As shown in FIG. 17, in the optical pickup mechanism 110, when the optical pickup 111 has been moved radially of the optical disc D to a reading position generally in the center of the lead-in area of the optical disc D, the actuator portion 154 of the shutter 146 abuts the actuating projection 156 on the base 113. At this time, the sense piece 163 of the detection switch 162 is pushed by the switch counterpart 164 provided on the base 113. Thus, the detection switch 162 supplies a detection signal to the microcomputer 61 which counts the predetermined length of time. The drive motor 129 continuously run for the predetermined length of time to further move the optical pickup 111 over a predetermined distance as shown in FIG. 18. Thus, the shutter 146 is moved in the direction of arrow $C_2$ against the force of the tension coil spring 148. In the optical pickup mechanism 110, when the optical pickup 111 has been moved to the innermost circumference of the optical disc D, the shutter 146 is pivoted to the masking position where it will mask the opening 121 in the cover 120, as shown in FIG. 18. Thus, it is possible to prevent dust from adhering to the objective lens 118.

Note here that for a period after the detection switch 162 is turned on until the predetermined length of time elapses, namely, for a period for which the shutter 146 moves from the position where it masks the objective lens 118 to the unmasking position, the microcomputer 61 applies a reverse bias voltage to the focusing drive 64 as shown in FIG. 6. Thus, the objective lens 118 moves the objective lens 118 to the farthest position from the optical disc D and to the parking position inside the cover 120 as shown in FIGS. 7 and 8. Thus, when the shutter 146 is moved from the position where it unmasks the objective lens 118 to the masking position, the shutter 146 can be prevented from touching and scratching the objective lens 118. After elapse of the predetermined length of time, the microcomputer 61 applies no voltage or applies 0 V to the focusing drive 64. Thus, the objective lens 118 returns from the parking position to the reference position as shown in FIGS. 7 and 8. Therefore, it is possible to prevent the shutter 146 from touching and scratching the objective lens 118. It should be noted that should the shutter 118 touch the shutter 146, the touch is just a point contact and thus the scratching of the objective lens 118 can be minimized.

In the optical pickup mechanism 110, when the optical pickup 111 has been moved into the lead-in area located at the inner circumference of the recording area and where TOC is recorded, the shutter 146 is pivoted to the unmasking position and the objective lens 118 of the optical pickup 111 will face the optical disc D, in which position the optical pickup 111 is ready for reading information from the optical disc D. As shown in FIG. 17, the optical pickup 111 will read information signals from the optical disc D when the shutter 146 has been moved to the unmasking position.

In this case, when a read start signal is supplied to the microcomputer 61, the detection switch 162 is on, whereby the microcomputer 61 will detect that the shutter 146 of the optical pickup 111 is at the position where it masks the objective lens 118. Simultaneously, the microcomputer 61 applies a reverse bias voltage to the focusing drive 64 to move the objective lens 118 from the reference position to the parking position as shown in FIGS. 7 and 8 and thus prevent the shutter 146 from touching the objective lens 118 when the shutter 146 moves from the position where it masks the objective lens 118 to the unmasking position. The microcomputer 61 counts the predetermined length of time by the timer 62. When the microcomputer 61 detects that the predetermined length of time has elapsed and the detection switch 162 is off, it will pull in the objective lens 118 so that information signals, particularly, TOC, recorded in the lead-in area of the optical disc D can be read. That is, the focusing drive 64 is applied with a reverse bias voltage and a bias voltage. Thus, the objective lens 118 is moved to the focusing control position, parking position and then to the in-focus position as shown in FIGS. 7 and 8. After that, the moving mechanism 112 is ready for reading the information signals recorded in the optical disc D. The optical pickup 111 is located nearly in the center of the lead-in area of the optical disc D, and hence the optical pickup 111 can readily start reading TOC without having to make any operations for moving the optical pickup 111.

The above operations for pulling in the objective lens 118 to the parking position by applying the focusing drive 64 with the reverse bias voltage only at opening or closing of the shutter 151 are applicable in a following optical pickup device which is still another embodiment of the present invention.

Figure 19:
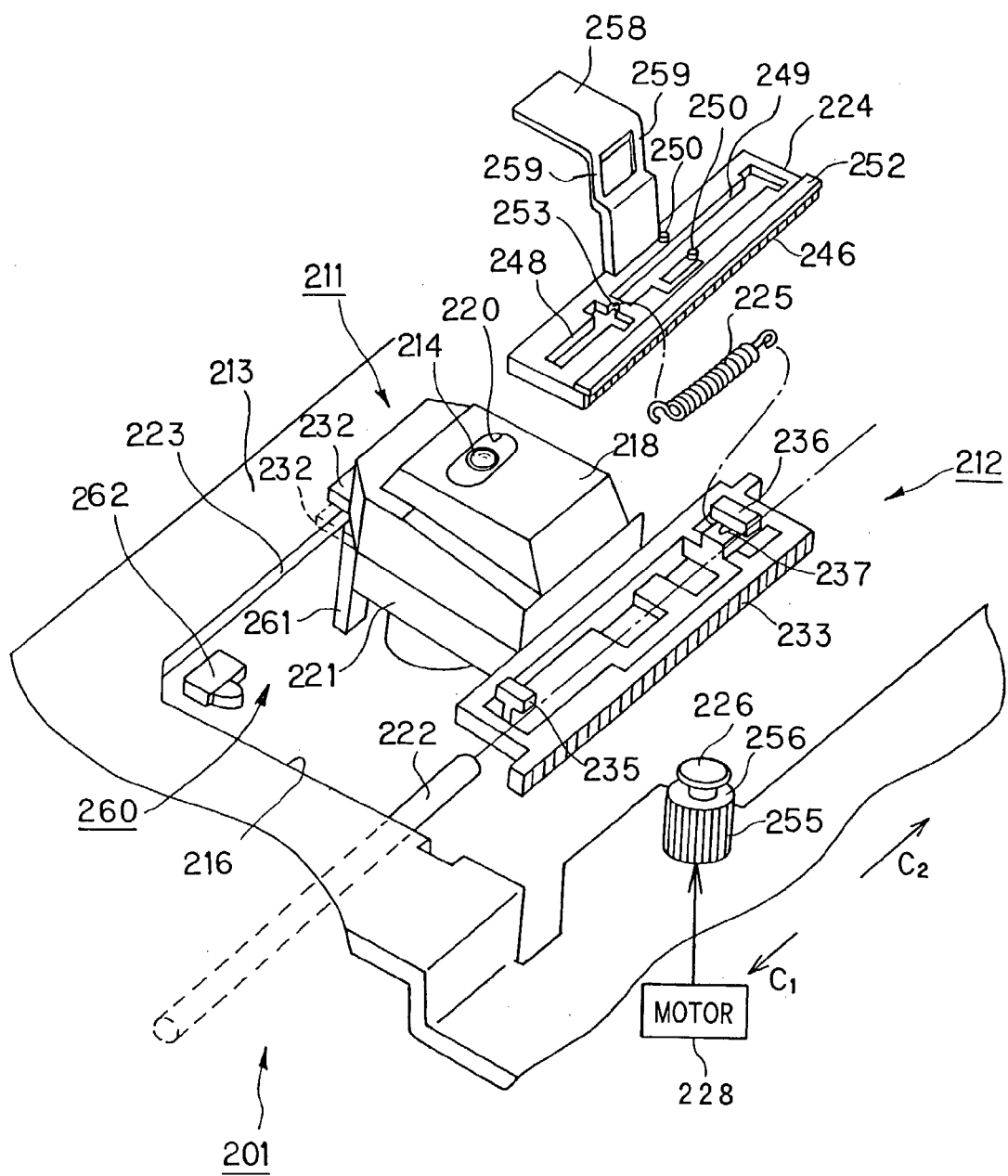
FIG. 19 is an exploded perspective view of still another embodiment of the optical pickup device according to the present invention.

Referring now to FIG. 19, there is illustrated in the form of an exploded perspective view the third embodiment of the optical pickup device according to the present invention. This optical pickup device or mechanism is generally indicated with a reference 201. As shown, the optical pickup mechanism 201 includes an optical pickup 211 having an objective lens 214, a moving mechanism 212 to move the optical pickup 211 in the directions of arrows $C_1$ and $C_2$ parallel to the radius of the optical disc D, and a base 213 to support the optical pickup 211 movably and the moving mechanism 212.

Figure 20:
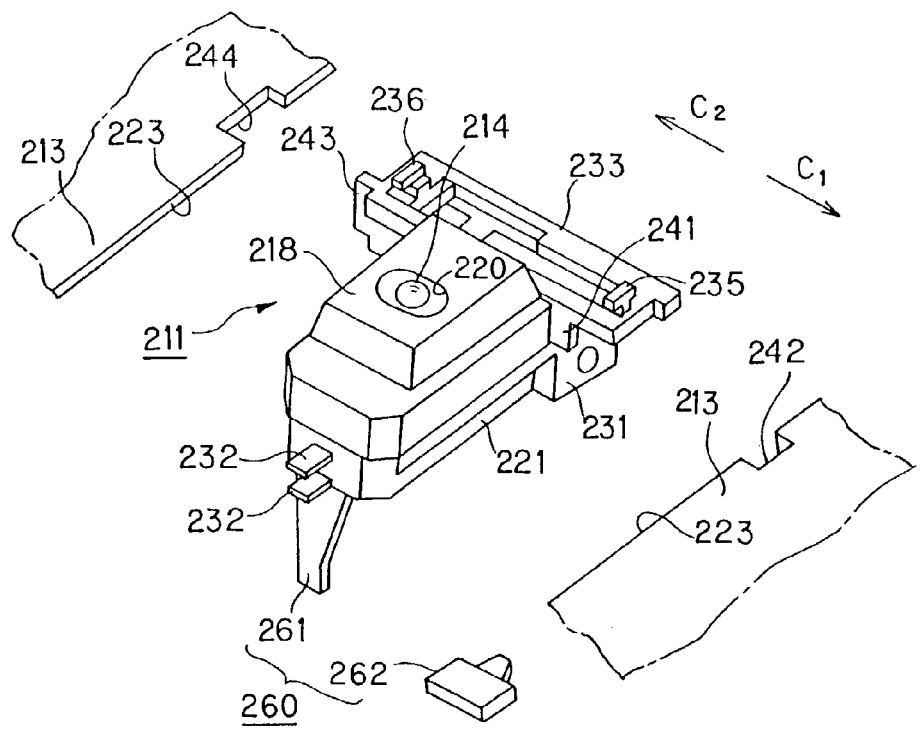
FIG. 20 is a perspective view of the optical pickup device.

As shown in FIG. 20, the optical pickup 211 is provided movably in an opening 216 formed in the base 213. The optical pickup 211 consists of an optical system including an objective lens 214, a drive block to move the objective lens 214 in a focusing direction parallel to the optical axis of the objective lens 214 and in a tracking direction orthogonal to the optical axis, and a cover 218 to cover the drive block.

The drive block of the optical pickup 211 includes a lens holder to hold the objective lens 214, a support mechanism to support the lens holder movably, and an electromagnetic circuit to move the objective lens 214 electromagnetically. Also, the optical system includes a light source to emit a laser light, a group of lenses forming together an optical path, and a photodetector to detect a return light from the optical disc D. In the optical pickup 211, a light beams emitted from a semiconductor laser or the like is collected by the objective lens 214 and projected onto the signal recording surface of the optical disc D, and a return light from the signal recording surface of the optical disc D is detected by the photodetector. Thus, information signals recorded in the optical disc D are read. Also, when reading information signals recorded in the optical disc D, the drive block moves the objective lens 214 in the focusing and tracking directions for controlling the focusing and tracking of the objective lens 214.

The cover 218 is formed from a resin material such as ABS resin to have a generally box-like shape whose top is generally parallel to the recording surface of the optical disc D. The cover 218 has formed therein nearly in the center thereof an operating 220 through which the objective lens 214 can face the recording surface of the optical disc D, as shown in FIG. 19. The opening 220 is formed to have a generally elliptic shape of which the longer diameter extends radially of the optical disc D.

As shown in FIG. 19, the moving mechanism 212 includes a support member 221 to support the optical pickup 211, a guide shaft 222 to support the support member 221 to be movable radially of the optical disc D, a guide 223 to guide the support member 221 being moved, a sliding member 224 to carry the support member 221, a coil spring 225 to force the sliding member 224 axially of the guide shaft 222 in relation to the support member 221, a drive gear 226 to drive the sliding member 224, and a drive motor 228 to rotate the drive gear 226 by means of a gear train.

As shown in FIG. 20, the support member 221 has the optical pickup 211 mounted on the main surface thereof. It includes a holder 231 through which the guide shaft 222 is movably penetrated, and a pair of guide pieces 232 movably engaged on the guide 223. As shown in FIG. 20, the support member 221 has formed integrally at one end thereof a rack 233 which is movable in mesh with the drive gear 226.

Figure 21:
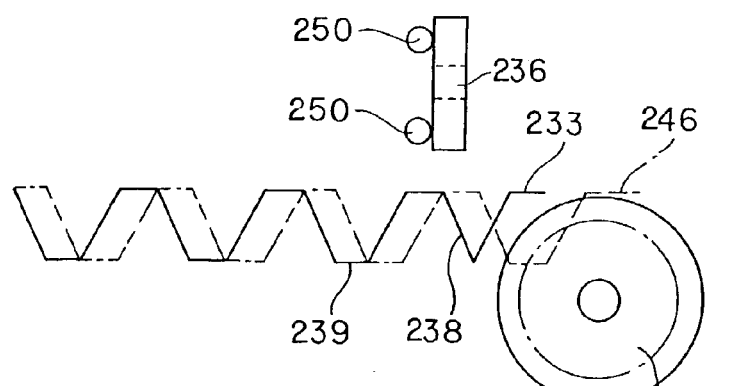
FIG. 21 is a plan view explaining a rack of a support base and rack of the sliding member, included in the optical pickup device.
Figure 22:
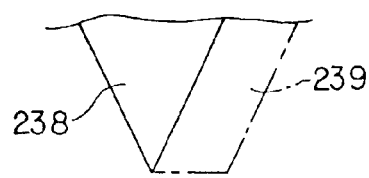
FIG. 22 is a plan view explaining one tooth of the rack of the support base.

As shown in FIG. 20, the rack 233 is formed parallel to the axis of the guide shaft 222. The rack 233 has formed integrally thereon a pair of engagement pieces 235 and 236 movably engaged in the sliding member 224 and a retainer 237 to which the coil spring 225 is hooked at one end thereon. Also, a tooth 238 formed at the end, at the outer-circumference side of the optical disc D, of he rack 233 is formed generally triangular to have a tooth thickness which is nearly a half of that of other teeth 239 as shown in FIGS. 21 and 22 so that the rack 233 of the support member 221 is easily separated and disengaged from the drive gear 226.

As shown in FIG. 20, the support member 221 has formed at a position thereof corresponding to the inner circumference of the optical disc D an inner circumference-side stopper 241 which limits the support member 221 from moving in the direction of arrow $C_1$. The inner circumference-side stopper 241 is formed projected from and integrally with the support member 221 to extend parallel to the moving direction of the latter. Also, the base 213 is cut (indicated at a reference 242) in one lateral edge thereof at the inner circumference side of the opening 216. The inner circumference-side stopper 241 provided on the support member 221 comes into and abuts the inner end of the cut 242 which will thus limit the support member 221 from moving toward the inner circumference of the optical disc D.

As shown in FIG. 20, the support member 221 has also formed at a position thereof corresponding to the inner circumference of the optical disc D an outer-circumference stopper 243 which limits the support member 221 from moving in the direction of arrow $C_2$. The outer-circumference stopper 243 is formed projected from and integrally with the support member 221 to extend parallel to the moving direction of the latter. Also, the base 213 is cut (indicated at a reference 244) in the other lateral edge thereof at the outer-circumference side of the opening 216. The outer-circumference stopper 243 provided on the support member 221 comes into and abuts the inner end of the cut 244 which will thus limit the support member 221 from moving toward the outer circumference of the optical disc D.

As shown in FIG. 19, the guide shaft 222 is disposed across the opening 216 in the base 213 and with the axis thereof being parallel to the radius of the optical disc D. It is fixed at opposite ends thereof to the base 213.

As shown in FIGS. 19 and 20, the guide 223 is formed parallel to the axis of the guide shaft 222 and along one lateral edge of the opening 216 in the base 213. The guide 223 has movably engaged thereon the guide pieces 232 of the support member 221 to limit the freedom of the support member 221 moving about the axis of the guide shaft 222.

As shown in FIG. 19, the sliding member 224 has a rack 246 formed parallel to the axis of the guide shaft 222, and it is disposed on the support member 221 with the rack 246 placed flush with the rack 233 of the support member 221. The sliding member 224 has formed therein engagement openings 248 and 249 in which the engagement pieces 235 and 236 on the rack 233 of the support member 221 are engaged respectively, to be movable parallel to the axis of the guide shaft 222.

As shown in FIGS. 19 and 21, the sliding member 224 has formed integrally thereon a pair of pins 250 which abut one (236) of the engagement pieces on the rack 233 of the support member 221 to limit the position of the sliding member 224 in relation to the rack 233. In addition, the sliding member 224 has formed integrally thereon along the rack 246 a guide piece 252 movably engaged with the drive gear 226, and also has formed integrally thereon a retainer 253 to which the coil spring 225 is hooked.

The coil spring 225 is hooked at one end thereof to the retainer 237 on the rack 233 of the support member 221 and at the other end the retainer 253 on the sliding member 224 as shown in FIG. 19. Therefore, the coil spring 225 forces, with its own elasticity, the sliding member 224 toward the rack 233 of the support member 221 and in the direction of arrow $C_2$ parallel to the axis of the guide shaft 222.

As shown in FIG. 19, the drive gear 226 has a gear portion 255 which is in mesh with the racks 233 and 246 of the support member 211 and sliding member 224, respectively. The drive gear 226 has also formed thereon at a portion near the free end thereof a guide groove 256 in which the guide piece 252 of the sliding member 224 is engaged movably, as shown in FIG. 19. The drive gear 226 and a gear train are rotatably disposed on the base 213 by means of the guide shaft 222. The drive motor 228 is disposed on the base 213 and in mesh with the gear train.

As shown in FIG. 19, the moving mechanism 212 includes a shutter 258 which is movable to a position where it will mask a side, opposite to the optical disc D, of the objective lens 214 of the optical pickup 211 and to a position where it will unmask the objective lens 214 and the latter will thus face the optical disc D.

The shutter 258 is formed from a resin material such as POM (polyoxymethylene) to have a generally rectangular shape and an area large enough to cover the opening 220 in the cover 218, as shown in FIG. 19. The shutter 258 is formed integrally with the sliding member 224 with a pair of linear elastic connecting pieces 259 between them, as shown in FIG. 19. The connecting pieces 259 forces, by its elasticity, the shutter 258 to above the cover 218.

As shown in FIGS. 19 and 20, the moving mechanism 212 includes a detection mechanism 260 to detect when the optical pickup 211 has been moved to the inner-circumference side of the lead-in area of the optical disc D where TOC is recorded. The detection mechanism 260 includes a sense piece 261 provided on the support member 221, and a detection or limit switch 262 which detects when the sense piece 261 abuts the detection switch 262 itself. The sense piece 261 is formed projected from and integrally on a portion, near the bottom, of the support member 221 to extend in the moving direction of the optical pickup 211. The detection switch 262 is disposed on a circuit board fixed to the base 213 in a position where the sense piece 261 abuts the detection switch 262 when the objective lens 214 of the optical pickup 211 has been moved nearly to the radial center of the lead-in area of the optical disc D. When the optical pickup 211 has moved nearly to the radial center of the lead-in area of the optical disc D, the detection switch 262 is pressed by the sense piece 261 to produce a detection signal.

Note here that as having previously been described with reference to FIG. 5, the detection signal generated by the detection switch 262 is supplied to the microcomputer 61. Upon reception of the detection signal from the detection switch 262, the microcomputer 61 will start counting a predetermined length of time by the timer 62, and drive the drive motor 228 for the predetermined length of time to move the sliding member 224 over a predetermined distance to the rack 233 of the support member 221 and thus move the shutter 258 to the position where it will cover the opening 220 in the cover 218.

The optical pickup mechanism 201 constructed as above operates, as will be described below, to cause the shutter 258 to mask or unmask the objective lens 214 as the optical pickup 211.

Figure 23:
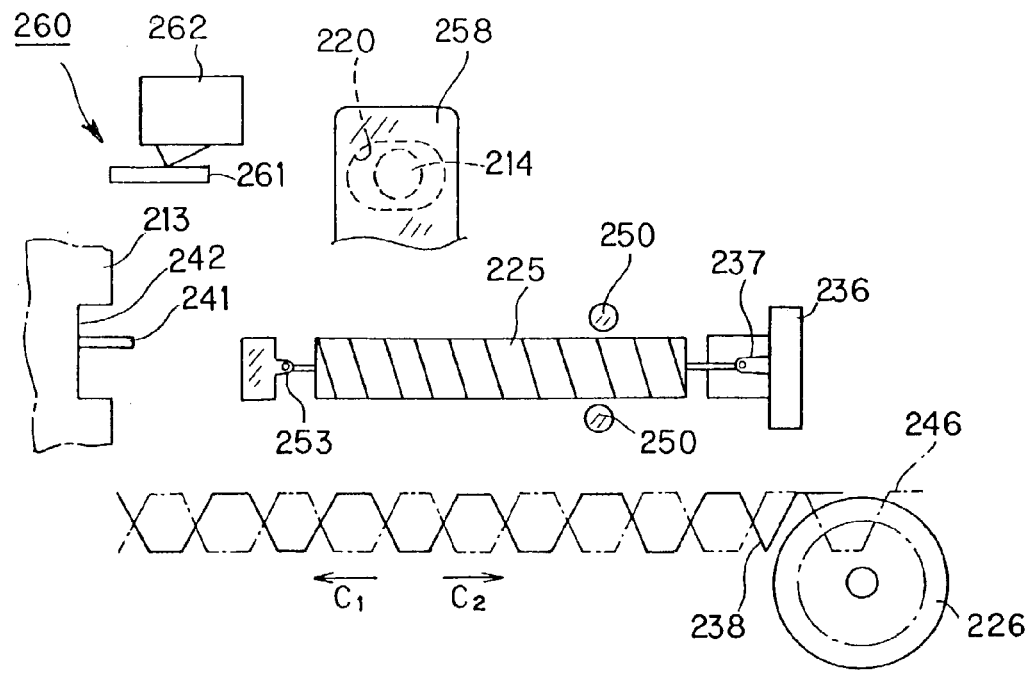
FIG. 23 schematically illustrates the optical pickup device with a shutter plate in the closed position.

First in a play waiting position of the optical pickup mechanism 201, the optical pickup 211 is positioned at the inner-circumference side of the lead-in area of the optical disc D. As shown in FIG. 23, the opening 220 in the cover 218, that is, the objective lens 214, is masked by the shutter 258. Therefore, when in the play waiting position, the shutter 258 prevents dust from adhering to the objective lens 214 in the optical pickup mechanism 201. In the optical pickup mechanism 201, when in the play waiting position, the rack 233 of the support member 221 is disengaged from the drive gear 226 while the rack 246 of the sliding member 224 having the drive gear 226 mounted thereon is in mesh with the drive gear 226, as will be seen in FIG. 23.

Figure 24:
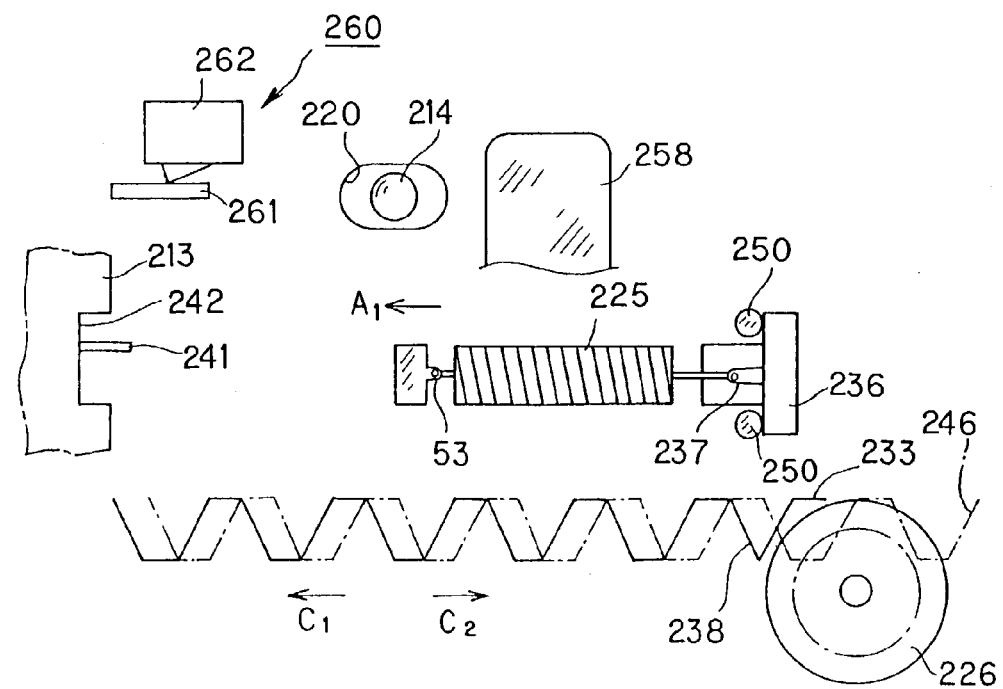
FIG. 24 schematically illustrates the shutter plate in the open position.

Next, once the optical pickup mechanism 201 starts playing the optical disc D, as the sliding member 224 whose rack 246 is in mesh with the drive gear 226 is moved by the drive gear 226 in the direction of arrow $C_2$, the shutter 258 is moved in the direction of arrow $C_2$ to the position where it will unmask the opening 220 in the cover 218 and the objective lens 214 will face the optical disc D, as shown in FIG. 24. Also, in the optical pickup mechanism 201, as the sliding member 224 is moved in the direction of arrow $C_2$, the pins 250 on the sliding member 224 abut the engagement piece 236 on the rack 233 of the support member 221, as shown in FIG. 24.

Figure 25:
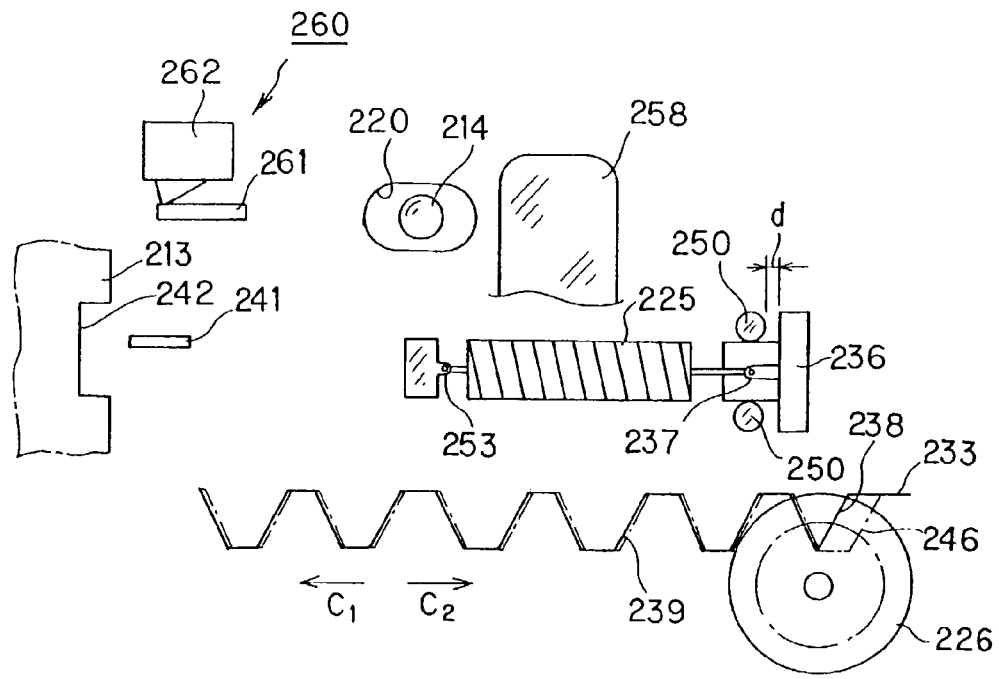
FIG. 25 schematically illustrates the optical pickup with the objective lens being in the lead-in area of the optical disc.

In the optical pickup mechanism 201, when the pins 250 abut the engagement piece 236, the coil spring 225 forces, by its elasticity, the support member 221 in the direction of arrow $C_2$. Thus, in the optical pickup mechanism 201, the rack 233 of the support member 221 is put in mesh with the drive gear 226 so that the teeth of the rack 233 of the support member 221 are aligned with those of the rack 246 of the sliding member 224 and these teeth are put in mesh with the teeth of the drive gear 226, as shown in FIG. 25. At this time, the support member 221 is displaced a very short distance d in the direction of arrow $C_2$ owing to the engagement of the rack 233 with the drive gear 226. Thus, in the moving pickup mechanism 212, as the support member 221 is displaced the distance d in the direction of arrow $C_2$, the engagement piece 236 is moved over the distance d away from the pins 250 as shown in FIG. 25. As will seen from FIG. 25, in the moving mechanism 212, as the engagement pin 236 thus moves away from the pins 250, the force or elasticity of the coil spring 225 will cancel the backlash between the racks 233 and 246 of the support member 221 and sliding member 224, respectively, and the drive gear.

Figure 26:
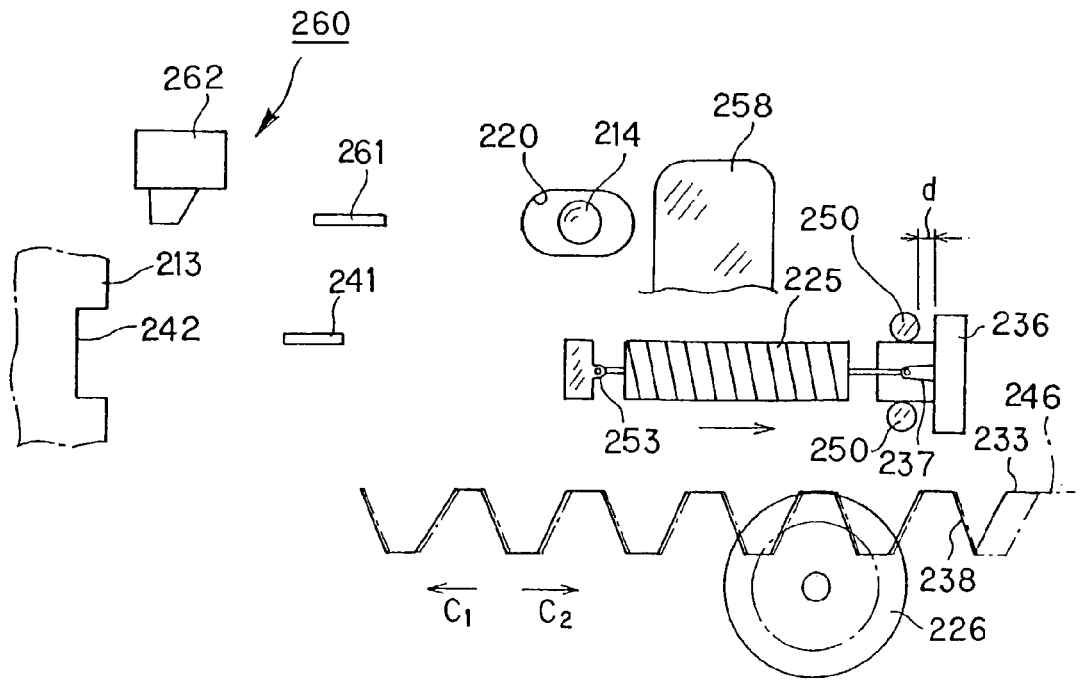
FIG. 26 schematically illustrates the optical pickup with the objective lens being in the recording area of the optical disc.

As shown in FIG. 26, in the optical pickup mechanism 201, when reading information signals from the recording area of the optical disc D, the optical pickup 211 is moved by the moving mechanism 212 with a high accuracy in the directions of arrows $C_1$ and $C_2$ since the backlash is canceled by the force of the coil spring 225. Thus, the information signals can accurately be read.

As shown in FIG. 24, in the optical pickup mechanism 201, when the optical pickup 211 is further moved in the direction of arrow $C_1$, the stopper 241 provided on the support member 221 comes into and abuts the inner end of the cut 242 which will thus limit the support member 221 from moving. At this time, the sense piece 261 of the support member 221 abuts the detection switch 262 which will thus be turned on to detect that the optical pickup has moved to the lead-in area. The detection switch 262 supplies a detection signal to the microcomputer 61. The microcomputer 61 will drives the drive motor 228 for the predetermined length of time counted by the timer 62. Thus, in the moving mechanism 212, the support member 221 is limited from moving so that the tooth 238 of the rack 233 of the support member 221 will leave from the drive gear 226 and the rack 233 be disengaged from the drive gear 226, as shown in FIG. 24.

In the moving mechanism 201, since the support member 221 is limited from moving, only the sliding member 224 is moved against the force of the coil spring 225 by the drive gear 226 drive for the predetermined length of time counted by the timer 62 in the direction of arrow $C_1$, as shown in FIGS. 23 and 24. Therefore, in the moving mechanism 212, the sliding member 224 is moved in the direction of $C_1$ in relation to the support member 221 to move the shutter 258 on the sliding member 224 in the direction of arrow $A_1$, as shown in FIGS. 23 and 24. The shutter 258 is thus moved to the position where it will mask the objective lens 214 of the optical pickup 211.

Note here that for moving the shutter 258 to the masking position shown in FIG. 23 or to the unmasking position shown in FIG. 24, the microcomputer 61 applies a reverse bias voltage to the focusing drive 64 as shown in FIG. 6. Then the focusing drive 64 moves the objective lens 214 to the parking position inside the cover 218 where it is farthest from the optical disc D, as shown in FIGS. 7 and 8. Thus, when the shutter 258 is moved to the unmasking position where it unmasks the objective lens 214 or to the masking position, it is possible to prevent the shutter 258 from touching and scratching the objective lens 214. When the predetermined length of time has elapsed, the microcomputer 61 applies no voltage, for example, 0 V, to the focusing drive 64. Thus, the objective lens 214 returns from the parking position to the reference position as shown in FIGS. 7 and 8. Therefore, it is possible to prevent the shutter 258 from touching and scratching the objective lens 214. It should be noted that should the objective lens 214 touch the shutter 258 due to a vibration or the like, the touch is just a point contact and so the scratch of the objective lens 214 can be minimized.

As having been described above, in the optical pickup mechanism 201 according to the present invention, when the objective lens 214 of the optical pickup 211 is in the lead-in area, the shutter 258 is positively placed in the unmasking position and so the optical pickup 211 can accurately read the lead-in area.

In this optical pickup mechanism 201, the opening 220 in the cover 218 can positively closed by the shutter 258 to prevent dust from adhering to the objective lens 214.

Note that the optical disc D referred to in the above description of the embodiments is a one having recorded therein information signals of which reading is started at the inner-circumference area of the optical disc D but the present invention is applicable to an optical disc having recorded therein information signals of which reading is started at the outer-circumference area of the optical disc. Also, the initial position, namely, play start position, of the optical pickup may be at the inner- or outer-circumference side of the optical disc. Further, the moving mechanism may be designed for the shutter to mask or unmask the objective lens when the optical pickup has moved to the outer-circumference position. Namely, the moving mechanism may be designed such that when the optical pickup is at the outer-circumference position, the shutter will mask or unmask the objective lens and thus when the shutter is moved for masking or unmasking, the objective lens will be moved from the reference position to the parking position where it is moved away from the optical disc.

Also note that the aforementioned disc drive unit is designed to read information signals from the optical disc but it may be designed to record information signals to a recordable optical disc or rewritable optical disc. Also, a magnetic head mechanism may be provided in a position where it faces the optical pickup device for writing and reading information signals to and from any other optical disc such as a magneto-optical disc.

INDUSTRIAL APPLICABILITY

As having been described in the foregoing, by moving a shutter by a feed screw which moves the optical pickup radially of an optical disc in such a manner as to mask or unmask the objective lens, the present invention provides an optical disc drive unit designed smaller and simpler in construction and in which any foreign matter such as dust can be prevented from adhering to he objective lens, without having to provide, as in the conventional disc drive units, any compartment to house the optical pickup when the apparatus is not in use as a mechanism to prevent any foreign matter such as dust from adhering to the objective lens.

Further, the present invention can prevent the shutter from touching and scratching or otherwise damaging the objective lens since the objective lens is further moved from a predetermined position away from the optical disc when masking the objective lens by the shutter.

The invention claimed is:

1. A recorder and/or player, comprising:
   an optical pickup having an objective lens supported movably along a substantially linear guide provided parallel to a radius of an optical disc; and
   a moving mechanism including:
      a feed screw provided substantially parallel to the radius of the optical disc; and
      a sliding member engaged at one end thereof on the feed screw, having formed at an other end a shutter that masks the objective lens, and being held on the optical pickup with an elastic material placed therebetween;
   the optical pickup being moved along with the sliding member as the sliding member is moved radially of the optical disc by the feed screw in rotation;
   when the optical pickup has moved along with the sliding member in one direction and arrived at a predetermined position, the optical pickup is limited from moving, and as the feed screw is further rotated, only the sliding member is moved in the one direction against the force of the elastic member, so that the shutter of the sliding member masks the objective lens;
   a detection switch provided on one of the base or the optical pickup to detect when the optical pickup has arrived at the predetermined position at the inner-circumference side of the optical disc and a switch counterpart provided on an other side of the optical disc; and
   a focusing controller to control focusing of the objective lense in relation to the optical disc, wherein
   when the optical pickup has moved along with the sliding member in the one direction and arrived at the predetermined position, the detection switch is turned on by the switch counterpart and a reversed voltage of a voltage applied for the focusing control is applied to the focusing controller, so that the focusing controller moves the objective lens along the optical axis thereof from a predetermined lens position to a lens position further away from the optical disc; and
   when the feed screw is further rotated for a predetermined length of time with the objective lens having been moved to the lens position further away from the optical disc, as the optical pickup is limited from moving, and only the sliding member is moved in the one direction against the force of the elastic member, the shutter of the sliding member masks the objective lens.

2. The recorder and/or player as set forth in claim 1, further comprising:
   a limiter provided on a rotation drive provided on a base having the guide formed thereon, wherein the rotation drive drives the optical disk; and
   a stopper provided in a position on the optical pickup opposite to the limiter;
   the optical pickup being moved along with the sliding member as the sliding member is moved toward the inner-circumference side of the optical disc by the feed screw in rotation; and
   when the optical pickup has moved along with the sliding member in the one direction until the stopper abuts the limiter, the optical pickup is limited from moving, and as the feed screw is further rotated, only the sliding member is moved in the one direction against the force of the elastic member, so that the shutter of the sliding member masks the objective lens.

* * * * *